(12) United States Patent
Joshi et al.

(10) Patent No.: US 11,922,949 B1
(45) Date of Patent: Mar. 5, 2024

(54) SOUND DETECTION-BASED POWER CONTROL OF A DEVICE

(71) Applicant: Amazon Technologies, Inc., Seattle, WA (US)

(72) Inventors: Aditya Sharadchandra Joshi, Sunnyvale, CA (US); Dibyendu Nandy, San Ramon, CA (US)

(73) Assignee: Amazon Technologies, Inc., Seattle, WA (US)

( * ) Notice: Subject to any disclaimer, the term of this patent is extended or adjusted under 35 U.S.C. 154(b) by 233 days.

(21) Appl. No.: 16/995,005

(22) Filed: Aug. 17, 2020

(51) Int. Cl.
*G10L 15/22* (2006.01)
*G10L 15/34* (2013.01)

(52) U.S. Cl.
CPC ........ *G10L 15/34* (2013.01); *G10L 2015/223* (2013.01); *G10L 2015/225* (2013.01)

(58) Field of Classification Search
CPC ......... G10L 15/22; G10L 15/00; G10L 15/01; G10L 15/05; G10L 15/065; G10L 15/20; G10L 15/26; G10L 2015/0631–0638; G10L 2015/221–228
USPC .... 704/233, 231, 225, 250, 251, 275, 270.1, 704/270, 266
See application file for complete search history.

(56) References Cited

U.S. PATENT DOCUMENTS

| | | | | |
|---|---|---|---|---|
| 2006/0062380 A1* | 3/2006 | Kim | ...................... | H04M 9/082 379/406.01 |
| 2012/0123772 A1* | 5/2012 | Thyssen | .............. | G10L 21/0208 704/226 |
| 2014/0222436 A1* | 8/2014 | Binder | .................... | G10L 15/22 704/275 |
| 2016/0004499 A1* | 1/2016 | Kim | ......................... | H04S 7/30 715/716 |
| 2018/0136715 A1* | 5/2018 | Kim | ........................ | G06F 3/165 |

* cited by examiner

*Primary Examiner* — Qi Han
(74) *Attorney, Agent, or Firm* — Kilpatrick Townsend & Stockton LLP

(57) ABSTRACT

Techniques for improving the power consumption of a device without impacting or with minimal impact to operations of the device are described. In an example, the device includes a processor. The device receives, while the processor is operating in a first power mode, first input data corresponding to first audio detected by a microphone. Based at least in part on the first input data, the device detects a sound event or ambient noise. Based at least in part on a detection of the ambient noise only, the device causes processor to operate in a second power mode in which the processor consumes less power than in the first power mode.

20 Claims, 13 Drawing Sheets

SOUND DETECTION-BASED POWER CONTROL OF A DEVICE

BACKGROUND

As voice recognition technology improves, systems that employ such technology continue to proliferate. Some systems employ what is referred to as near-field voice recognition, where a user speaks into a microphone located on a hand-held device, such as a remote control or mobile device. Other systems employ far-field voice recognition, where a user can speak to a device while the user is within the general vicinity of the device, e.g., within the same room, but not necessarily in close proximity to or even facing the device. Both far-field devices and near-field devices can be used for audio and video communications with other devices.

BRIEF DESCRIPTION OF THE DRAWINGS

Various embodiments in accordance with the present disclosure will be described with reference to the drawings, in which.

DETAILED DESCRIPTION

Figure 1:
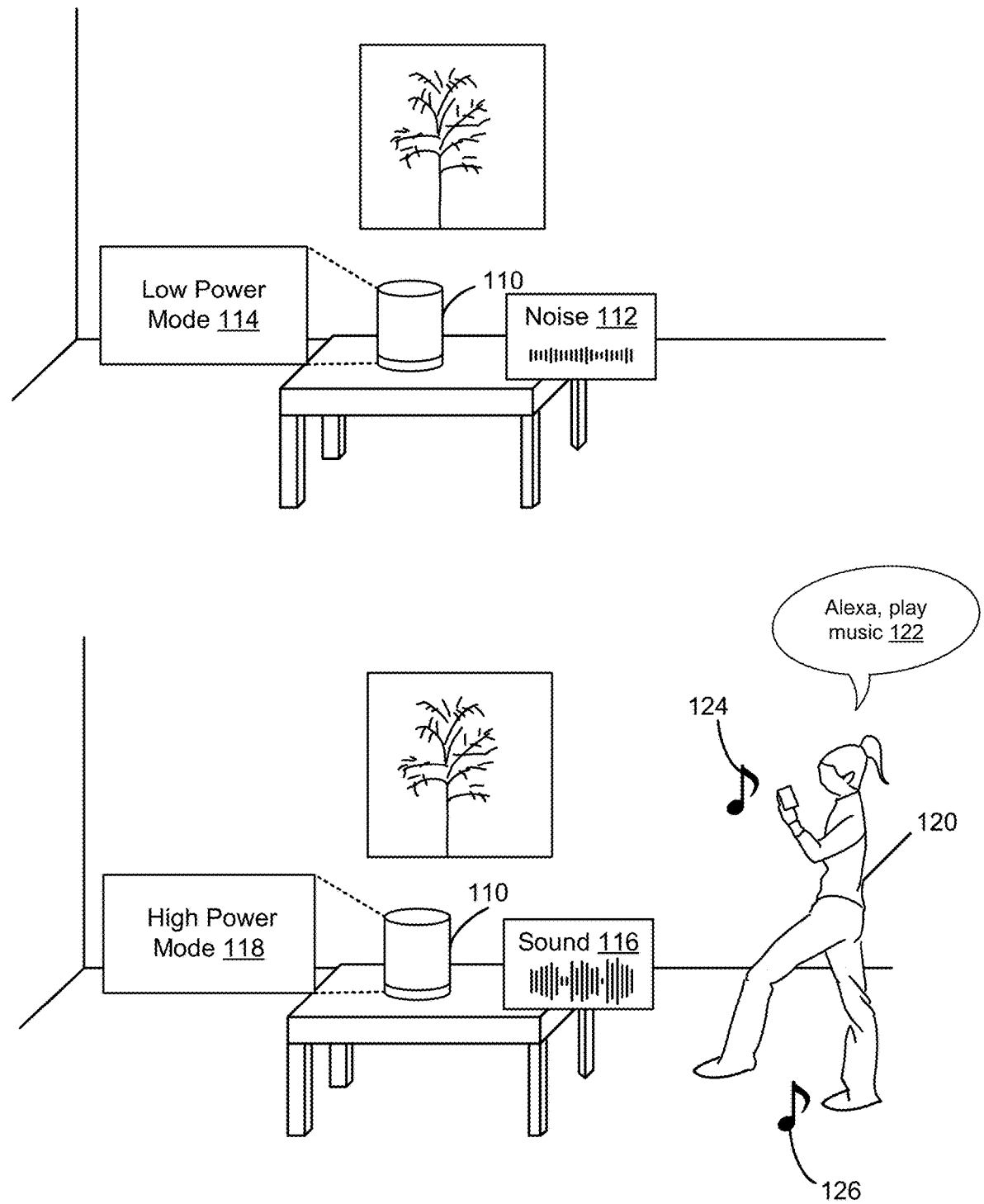
FIG. 1 illustrates an example of sound detection control of a power mode of a device, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order to not obscure the embodiment being described.

Embodiments of the present disclosure are directed to, among other things, improving the power consumption of a device without impacting or with minimal impact to operations of the device. In an example, sound detection is implemented as an element in a system used to control the power consumption of the device. In particular, the device can support multiple power modes, where a first power mode consumes more power than a second power mode. In the first power mode, various computing components of the device (e.g., a central processing unit) are operational and support various processing functionalities of the device (e.g., the central processing unit providing playback functionalities). In the second power mode, some or all of the processing functionalities can be reduced. For instance, the central processing unit may be decoupled from a power source or its processing functions may be implemented using a relatively longer clock cycle. The device includes a sound detector that is operational in the different power modes. While the device is in the first power mode, the sound detector detects whether audio received at the device includes a sound event. If no sound event is detected, some or all of the computing components (e.g., the central processing unit) are transitioned into the second power mode, thereby reducing power consumption. While the device is in the second power mode, the sound detector continues to monitor and detect sound events. If a sound event is detected, the computing components (e.g., the central processing unit) are transitioned back into the first power mode, thereby re-enabling the various processing functionalities.

To illustrate, consider an example of a smart speaker that is responsive to a wake word (e.g., "Alexa") and supports audio playback operations (e.g., streaming audio files). The smart speaker includes a digital signal processor, a central processing unit, and a sound detector, among other components. The digital signal processor receives audio data indicative of a speech input (e.g. "Alexa, play my favorite music album"), detects the wake word, and sends the remaining audio data (e.g., "play my favorite music album") to the central processing unit. The central processing unit, locally or in conjunction with a cloud computing service, performs audio processing operations, such as audio-to-text and natural language understanding operations, to determine that particular audio files are to be streamed and, accordingly, starts the audio streaming. At some point in time, the audio streaming stops. Subsequently, the sound detector detects ambient noise only and sends event data to the central processing unit about transitioning from the first power to the second power mode. In response, the central processing unit operates in the second power mode, thereby reducing its power consumption when there is no sound around the device and when its streaming operations have already been stopped. A user may enter the room where the smart speaker is located. The sound detector detects a sound (e.g., footsteps or speech input of the user) from the resulting new audio data and sends updated event data to the central processing unit about transitioning back to the first power mode. The digital signal processor also receives the new audio data and detects whether it includes the wake word (e.g., in the case of speech input). Because the central processing unit is in the first power mode, the central processing unit can support further audio processing operations on the new audio data and playback operations as applicable (e.g., the speech input requesting a new music stream).

Embodiments of the present disclosure provide various technological improvements over a conventional device. For example, the power consumption of the device implementing the embodiments is reduced as the device consumes a relatively lower amount of power, while still delivering the same functionalities. Referring back to the above illustration of a smart speaker, rather than retaining the central processing unit in the first power mode when there is no sound activity around the device and when no playback or other operations are ongoing on the central processing unit, the central processing unit may be powered off or the period of its clock cycle may be increased. Therefore, the device controllably and intelligently consumes less power when, otherwise, the functionality associated with higher power consumption is not needed. However, when sound is detected, the central processing unit transitions back into the first power mode to provide full processing functionality.

In the interest of clarity of explanation, various embodiments of the present disclosure are described in connection with a high power mode and a low power mode. "High" and "low" are used herein as relative terms, where "high" indicates a higher state than "low." However, the embodiments are not limited as such and similarly apply to other modes (e.g., "high," "medium," and "low"). Generally, a computing component consumes more power when operating in a first power mode relative to its operation in a second power mode. Different techniques exist for the power consumption in each power mode. In one technique, the computing component can be coupled to a power source in the first power mode and decoupled from the power source in the second power mode. In another technique, the computing component's clock cycle period can be increased to operate at a lower processing rate in the second mode, thereby consuming less power. In yet another technique, the computing components supports a set of operations in the first power mode and a subset of these operations in the second power mode.

Furthermore, various embodiments of the present disclosure are described in connection with audio processing operations by a computing component (e.g., audio playback operations). However, the embodiments of the present disclosure are not limited as such and similarly apply to other types of processing operations by the computing component, where the support of the processing operations can change depending on the power mode in which the computing component is operating. For instance, sound detection can be used to controllably enable and disable video processing operations (e.g., to activate video monitoring in a video surveillance system). Generally, sound detection can be used as a form of presence detection, where if a sound, other than ambient noise, is detected in vicinity of a device, the occurrence of the sound is attributed to a presence of an object (e.g., a human, a pet, a moving vehicle, etc.). Operations by a computing component that are available when the object is present can be, therefore, controlled via the sound detection, where the computing component can operate in the high power mode when the sound is detected and support the processing operations. Otherwise, the computing component operations in the low power mode, thereby reducing power consumption and saving power.

FIG. 1 illustrates an example of sound detection control of a power mode of a device 110, according to embodiments of the present disclosure. As illustrated, the device 110 may be located in a room. Upon detection of ambient noise 112 in the room, the device 110 operates in a low power mode 114. In comparison, upon detection of a sound 116, the device 110 operates in a high power mode 118. As used herein, sound 116 refers to an acoustic activity occurring in vicinity of the device 110 and originating from a source in the vicinity, where the sound 116 is other than ambient noise.

In an example, the device 110 represents a computing device that is capable of supporting various computing services including, for instance, audio processing operations. In particular, the device 110 includes one or more processors, one or more memories storing computer-readable instructions, one or more audio processing systems, one or more network interfaces, one or more microphones, one or more speakers, and/or other computing components. Audio can be detected by a microphone and can be processed by an audio processing system to determine whether the audio includes the noise 112 or the sound 116. In an illustration, the device 110 can be any of a smart speaker, a multimedia device, a smart home device, an Internet of Things (IoT) device, or any other type of suitable computing device.

When operating in the low power mode 114, the device 110 consumes less power relative to when the device 110 is operating in the high power mode 118. Equivalently, functionalities of the device 110 are decreased in the low power mode 114, relative to the high power mode 118. For instance, at least some of the computing components of the device 110 are deactivated in the low power mode 114, whereas these components are activated in the high power mode 118. In an illustration, an audio processing system of the device 110 includes a central processing unit and a digital signal processor. In the low power mode, the central processing unit and/or the digital signal processor are deactivated. Deactivation of a computing component includes any or a combination of decoupling the computing component from a power source (external or internal to the device 110), increasing the clock cycle period of the computing component (e.g., the rate at which operations are performed by the computing component is decreased), or terminating a subset but not necessarily all of the operations.

Generally, the detection of the sound 116 can be used as a form of presence detection of an object 120 that has moved into the room or to the vicinity of the device 110. The object 120 can be a person, a pet, or any other type of movable object, whether a living being or not. The sound 116 can originate from one or more sources associated with the object 120. In the illustration of FIG. 1, three sources are shown. In particular, the sound 116 can correspond to speech input 122 of the object 120 (e.g., shown as "Alexa, play music"). The sound 116 can correspond to audio 124 emitted from a mobile device that the object 120 is operating (e.g., a ringtone or music emitted by a mobile device). Additionally or alternatively, the sound 116 can correspond to audio 126 emitted by the motion of the object 120 based on the nature of this motion (e.g., footsteps of the object 120, clapping by the object 120, etc.).

The device 110 receives any of the sounds (e.g., the speech input 122, the mobile device's audio 124, and/or the audio 126 corresponding to the object's 120 motion). For instance, one or more microphones of the device 110 detects the audio(s) and generates audio data. In turn, an audio processing system of the device 110 detects the sound 116 and causes the device 110 (or at least some computing components thereof) to transition to the high power mode 118 if the device 110 was operating in the low power mode 114.

In an example, detecting the sound 116 includes detecting sound events based on one or more root mean square metrics, where such root mean square metrics are derived by the audio processing system based on the audio data. A sound event can include a start of the sound 116 or a continuity of the sound 116 over time. Although a time domain-based analysis is described herein, other types of analysis are possible to detect a sound event including, for instance, a frequency domain-based analysis (e.g., an analysis of the frequency properties of the sound 116 following a Fast Fourier Transformation (FFT)).

When the device 110 is in the low power mode 114, if the start of the sound 116 is detected, the device 110 transitions to the high power mode 118. As long as the continuity of the sound 116 is detected, the device 110 remains in the high power mode 118. As used herein, a "continuity of a sound" refers to the sound having a duration that exceeds a duration threshold (e.g., more than one-hundred milliseconds), where this duration threshold can correspond to the minimum average amount of time for a human to notice a sound. Once the continuity is no longer detected and no other sound start is detected, the device 110 transitions back to the low power mode 114. In this case, an exception may be applicable, whereby if the device 110 was performing audio processing operations (e.g., playback operation, such as streaming music), the transition back to the low power mode 114 may not be performed or the continuous detection of whether detected audio includes ambient noise or sound can be temporarily disabled until the audio processing operations are terminated.

Hence, the device 110 operates in the high power mode 118 only when needed. Otherwise, the device 110 operates in the low power mode 114, with a relatively smaller set of functionalities and improved power savings. Upon the presence of the object 120 in the room or in vicinity of the device 110, the device 110 can be quickly transitioned into the high power mode 118 to provide its full functionality, where the presence is detected based on the change in audio from merely including ambient noise to also including sound.

Figure 2:
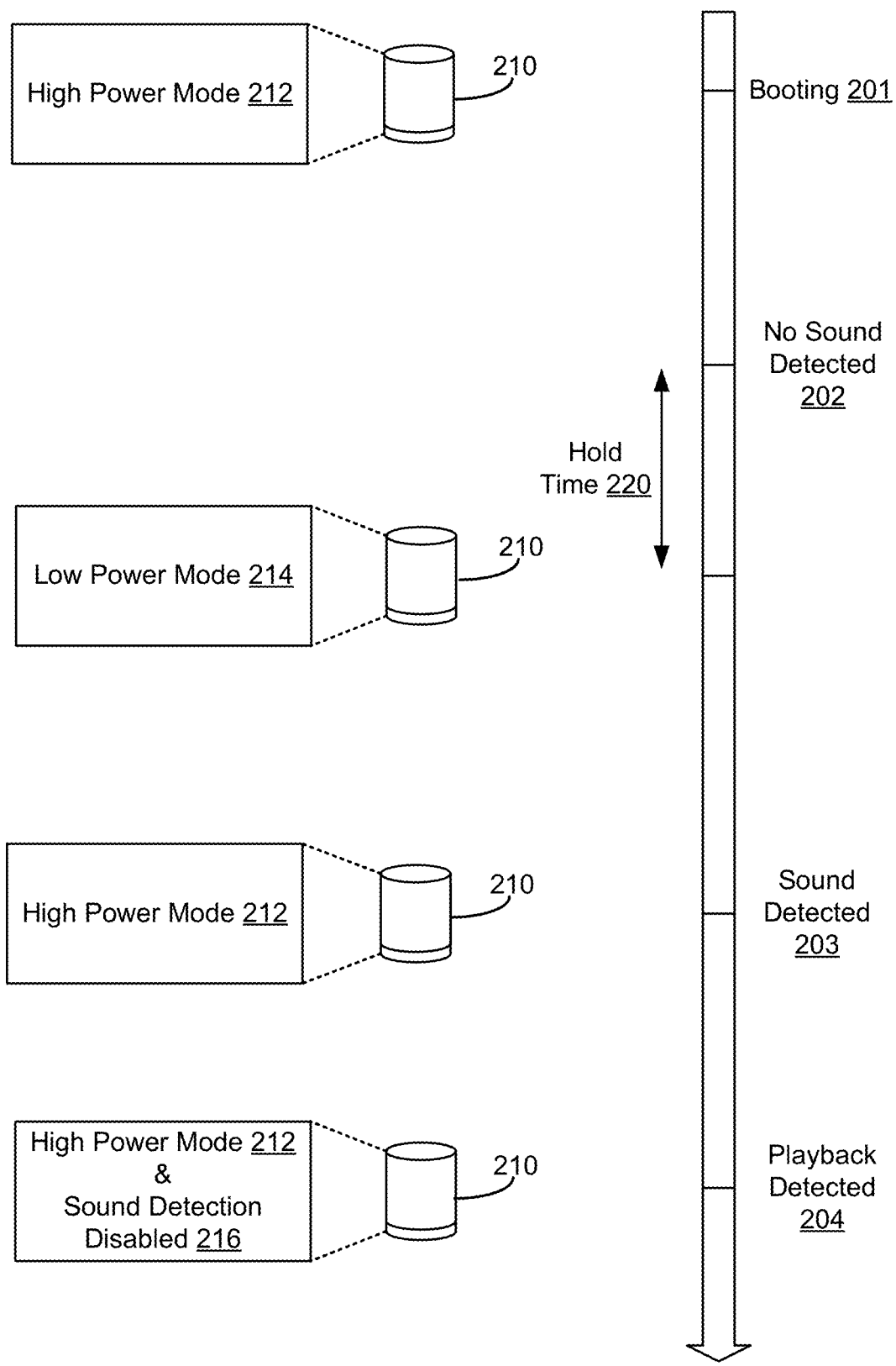
FIG. 2 illustrates an example of transitions between power modes of a device, according to embodiments of the present disclosure.

FIG. 2 illustrates an example of transitions between power modes of a device 210, according to embodiments of the present disclosure. The device 210 is an example of the device 110 of FIG. 1. The power modes include a high power mode 212 and a low power mode 214, which are examples of the high power mode 118 and the low power mode 114, respectively, of FIG. 1.

In an example, upon booting 201 of the device 210, the device 210 defaults to operating in the high power mode 212. In this way, the device 210 can start with providing its full functionalities and subsequently only transition to the low power mode 214 and save on power consumption as applicable.

Thereafter, no sound is detected 202. In this case, and assuming there are no ongoing audio processing operations or other functionalities on the device 210, the device 210 transitions to the low power mode 214. In particular, the device 210 receives and processes audio data, determines that the audio data includes ambient noise only, and transitions to the low power mode 214. The audio data can be generated by one or more microphones of the device 210. Additionally or alternatively, the audio data can be generated by one or more microphones remote from the device 210 (e.g., located in the same room as the device 210 or in a different room) and received by the device 210 via one or more input ports.

The transition may not be immediate. Instead, a hold time 220 is observed, where the hold time can be pre-configured or defined in a user setting as a time period during which the device 310 (including a central processing unit or processor thereof) remains in the high power mode 212 even though no sound was detected (e.g., set to be a few seconds or minutes long). During the hold time, the device 210 remains in the high power mode 212. Upon an expiration of the hold time 220, the device 210 starts operating in the low power mode 214. The use of the hold time 210 helps with preventing the back and forth transitioning due to short periods of no sound activities and bursts of ambient noises being detected.

Once the device is in the low power mode 214, the device 210 can continuously or intermittently receive additional audio data. This audio data is further processed. Upon sound being detected 203, the device 210 transitions into the high power mode. Here, the transition can be immediate (e.g., quicker than the transition into the low power mode by not using any hold time).

While being in the high power mode 212, the device 210 supports various audio-processing functionalities including, for instance, playback. Ongoing audio-processing functionalities can cause the device 210 to emit sound (e.g., music audio). The emitted sound can be sensed by the device's 210 microphone that generates corresponding audio data. This audio data is further processed, resulting in a sound detection, thereby, resulting in the device 210 remaining in the high power mode 212. Alternatively, upon detection of an ongoing audio-processing functionality (shown in FIG. 2 as playback being detected 204), the sound detection can be disabled 216 altogether. In this case, the audio data generated by the device's 210 microphone may not be processed for the detection of a sound activity (although the audio data may be processed for other purposes, such as for detection of a wake word and for natural language understanding of a speech input).

Figure 3:
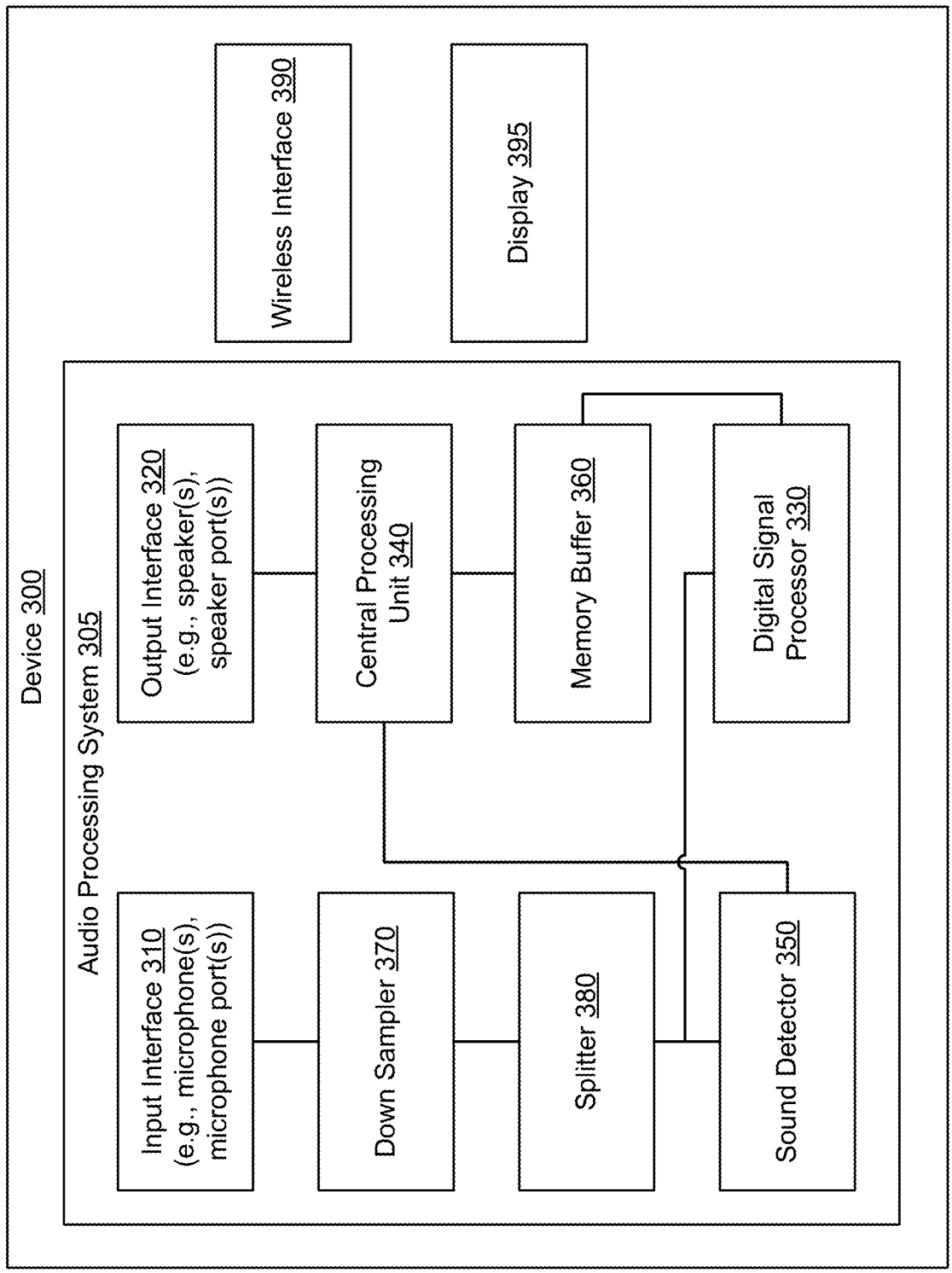
FIG. 3 illustrates an example of components of a device that supports sound detection-based control of power modes, according to embodiments of the present disclosure.

FIG. 3 illustrates an example of components of a device 300 that supports sound detection-based control of power modes, according to embodiments of the present disclosure. The device 300, such as the device 110 of FIG. 1 or the device 210 of FIG. 2, includes at least one audio processing system 305 and other components supporting audio and non-audio processing functionalities. Generally, the audio processing system 305 supports a number of audio-processing operations including, for instance, sound detection, automatic speech recognition (ASR), voice over internet protocol (VOIP) processing, playback, and the like.

In an example, the audio processing system 305 includes an input interface 310, an output interface 320, a digital signal processor 330, a central processing unit 340, a sound detector 350, a memory buffer 360, a down sampler 370, and a splitter 380 that can be communicatively coupled via one or more data buses. Each of these computing components is described herein next.

The input interface 310 supports detecting audio and/or receiving audio data. For instance, the input interface 310 includes one or more microphones. Additionally or alternatively, the input interface 310 includes one or more input ports (e.g., one or more wired audio connectors or one or more wireless data interface that support WiFi, Bluetooth, or other communications protocol), each of which can be coupled with a microphone that may be remote from the device.

The output interface 320 supports the outputting of data. The output can be presented at the device and/or can be sent to another device. For instance, the output interface 320 includes one or more speakers (or some other user interface, such as a graphical user interface, a light source that includes light emitting diodes, and the like). Additionally or alternatively, the output interface includes one or more output ports (e.g., one or more wired audio connectors or one or more wireless data interfaces that support WiFi, Bluetooth, or other communications protocol), each of which can be coupled with a speaker or another device that may be remote from the device.

The digital signal processor 330 receives and processes audio data for ASR (including, for instance, wake word detection), VOIP, echo cancellation, and other audio processing operations. The audio data can be received from the input interface 310 and/or from the down sampler 370 that may down sample the output from the input interface 310.

The central processing unit 340 executes one or more applications, each of which can provide audio-related functionalities. For instance, the central processing unit 340 can locally, or in conjunction with a cloud computing service, perform audio-to-text translation, natural language processing (NLP) and semantic understanding, audio playback, and other functionalities. Input data to the central processing unit 340 can include audio data from the input interface 310, from the down sampler 370, and/or from the digital signal processor 330. Output data of the central processing unit 340 can be sent to the output interface 320. The central processing unit 340 sends the output data to the output interface 320 (e.g., a speaker) only while operating in the high power mode (e.g., the output data is not sent while the processing unit 340 is operating in a low power mode).

The sound detector 350 receives audio data and determines based thereon whether the audio data includes a sound event. The audio data can be received from the input interface 310, from the down sampler 370, and/or from the digital signal processor 330. Further, the sound detector 350 can output a sound event indicating whether the sound event was detected or not. When the event data indicates no sound event, one or more computing components of the device can transition into the low power mode. When the event data indicates the sound event, one or more computing components of the device can transition into the high power mode if not already operating in the high power mode. Generally, the sound detector 350 can be implemented as a processor and a memory (e.g., a system on a chip (SoC)) that stores computer-readable instructions (e.g., software or firmware) executable by the processor. Nonetheless, a hardware implementation of the sound detector 350 (e.g., one not involving computer-readable instructions) is possible.

The memory buffer 360 stores audio data that is to be processed by a computing component of the device. In particular, if the computing component is operating in the low power mode and the audio data is received, this audio data is buffered in the memory buffer 360 and can be accessed by the computing component once the computing component transitions to the high power mode. In an example, the memory buffer 360 is implemented as a ring buffer of a particular length (e.g., capable of storing a few seconds of audio data depending on the sampling rate and frame length of the audio data).

As indicated above, the down sampler 370 samples down the audio data generated and/or received by the input interface from a first sampling rate to a second sampling rate (e.g., from ninety-six kHz to sixteen kHz, with an eight millisecond frame length). The down sampled audio data can be output to any of the digital signal processor 330, the central processing unit 340, the sound detector 350, and/or the memory buffer 360.

The splitter 380 can split audio data into multiple paths such that the audio data can be sent in parallel to multiple computing components. For instance, the down sampled data that is output of the down sampler 370 can be fed to both the digital signal processor 330 and the sound detector 350 via the splitter 380.

In the low power mode, one or more of the computing components of the audio processing system 305 can be deactivated based on the event data output by the sound detector 350. For instance, the central processing unit 340 is deactivated. Optionally, the digital signal processor 330 and/or the output interface 320 are also deactivated. Nonetheless, some of the computing components of the audio processing system 305 remain activated in the low power mode. Generally, these components relate to the detection of the sound. For instance, the sound detector 350 remains activated in addition to the input interface 310, the memory buffer 360, down sampler 370, and the splitter 380.

In comparison, in the high power mode, the computing components of the audio processing system 305 are activated. In situations where sound detection is not needed in the high power mode (e.g., the central processing unit 340 is outputting music data via the output interface 320), the sound detector 350 can be disabled (e.g., can receive audio data but may not process it or if processed, the event data that may be output by the sound detector may be ignored) or deactivated (e.g., the sound detector 350 is decoupled from a power source, its clock cycle is increased, or the execution of its computer-readable instructions is terminated).

In an example, the central processing unit 340 is deactivated when the event data of the sound detector 350 indicates no sound event (or, equivalently, that the low power mode is applicable). If audio data is received and includes a sound while the central processing unit 340 is deactivated, this audio data can be stored in the memory buffer 360. This audio data also results in the sound detector 350 sending event data indicating a sound event (or, equivalently, that the high power mode is applicable). In response, the central processing unit 340 transitions to the high power mode. In this case, the central processing unit 340 needs to catch up to real-time audio data (e.g., audio data currently received, but has to first process the buffered audio data. Hence, for a short period of time, the central processing unit 340 processes the buffered audio data at a rate faster than the one used for processing the real-time audio data. In particular, the audio data includes audio frames, each having a particular length of time (e.g., eight milliseconds) and including a number of audio samples (e.g., one-hundred twenty-eight audio samples when a sixteen kHz sampling rate is used). The central processing unit 340 processes more than the length of time of audio samples in each time interval equal to the length of time (e.g., more than eight milliseconds of audio or, equivalently, more than one-hundred twenty-eight audio samples are processed by the central processing unit 340 in eight milliseconds intervals).

Other components of the device 300 include, for instance, a wireless interface 390 and a display 395. The wireless interface 390 enables wireless communications between the device 300 and other devices. For instance, the wireless interface 390 includes a network interface card, a modem, a radio frequency (RF) receiver, a radio frequency transmitter, and the like. The display 395 provides an input and/or output modality other than audio. For instance, the display 395 can include a touchscreen that presents a graphical user interface (GUI) for receiving user input and for outputting graphical data including video.

Figure 4:
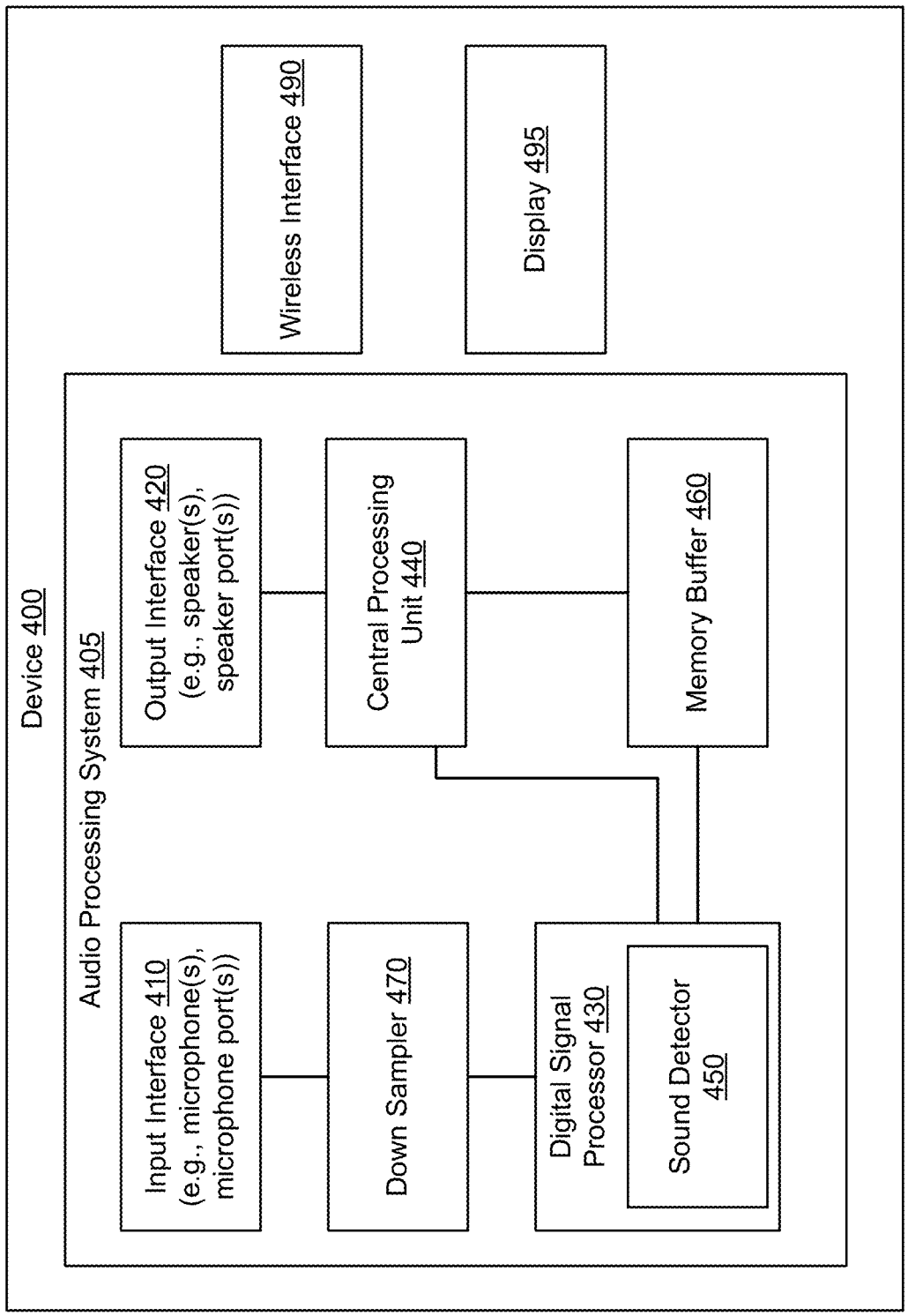
FIG. 4 illustrates another example of components of a device that supports sound detection-based control of power modes, according to embodiments of the present disclosure.

FIG. 4 illustrates another example of components of a device 400 that supports sound detection-based control of power modes, according to embodiments of the present disclosure. The device 400, such as the device 110 of FIG.

1 or the device 210 of FIG. 2, includes at least one audio processing system 405 and other components supporting audio and non-audio processing functionalities. Generally, the audio processing system 405 supports a number of audio-processing operations including, for instance, sound detection, ASR, VOIP processing, playback, and the like.

In an example, the audio processing system 405 includes an input interface 410, an output interface 420, a digital signal processor 430, a central processing unit 440, a sound detector 450, a memory buffer 460, and a down sampler 470. Each of these computing components is similar to the corresponding computing component of the audio processing system 305 of FIG. 3. In the interest of brevity, similarities of the components are not repeated herein.

As illustrated, and unlike the audio processing system 305 of FIG. 3, the digital signal processor 430 includes the sound detector 450. For instance, the sound detector 450 can be implemented as a module of the digital signal processor 430 or these two computing components can be implemented on the same system on a chip.

In an example, the down sampler 470 sends audio data to the digital signal processor 430. Because the digital signal processor 430 includes the sound detector 450, no splitter is needed (e.g., the splitter 380 can be omitted from the audio processing system 405).

Like the device 300, other components of the device 400 include, for instance, a wireless interface 490 and a display 495. Here also, the wireless interface 490 enables wireless communications with other devices, whereas the display 495 enables an input and/or output modality other than audio.

Figure 5:
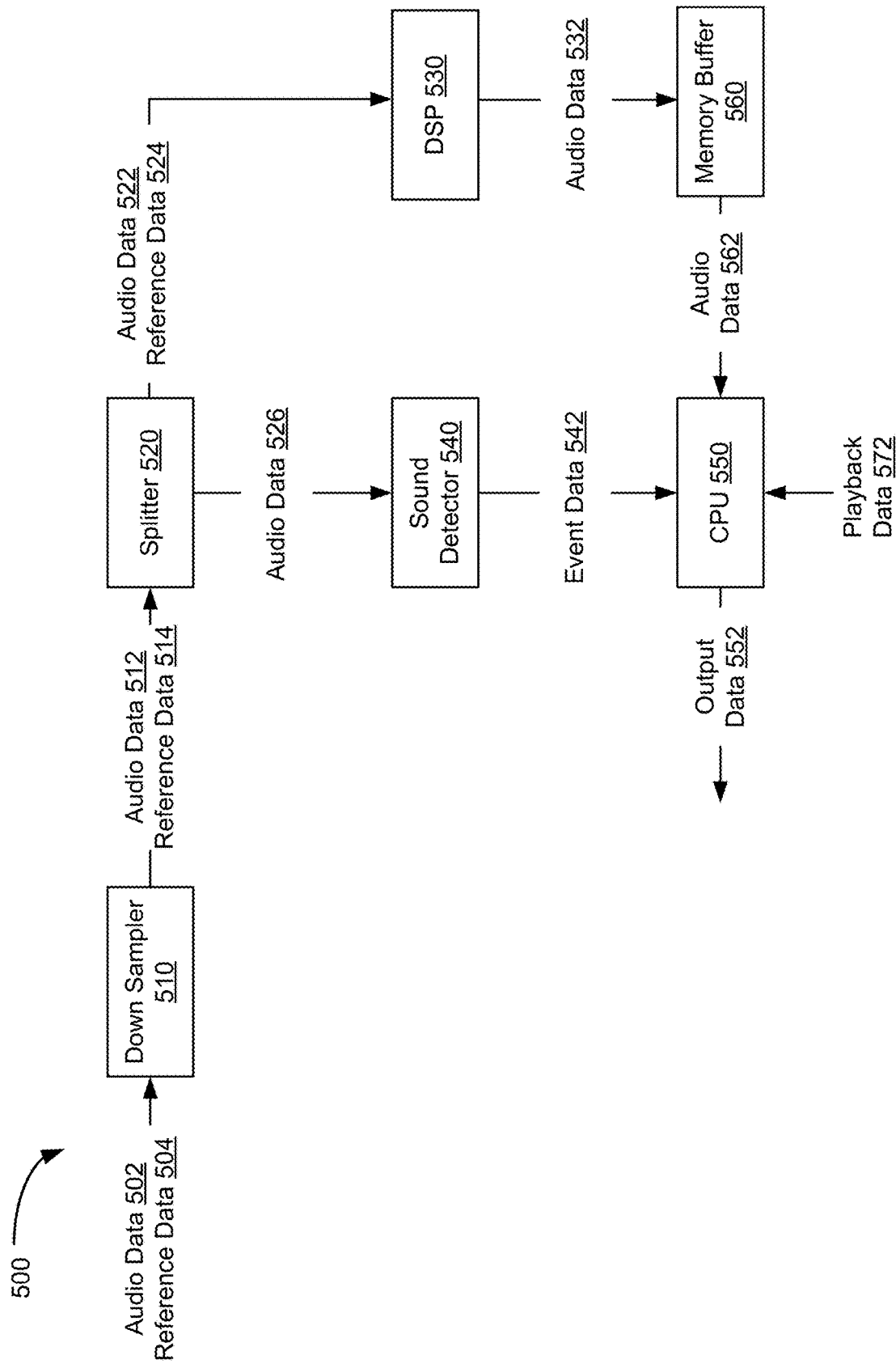
FIG. 5 illustrates an example of an audio processing system of a device that supports sound detection-based control of power modes, according to embodiments of the present disclosure.

FIG. 5 illustrates an example of an audio processing system 500 of a device that supports sound detection-based control of power modes, according to embodiments of the present disclosure. The audio processing system 500 is an example implementation of the audio processing system 305 of FIG. 3. In this implementation, a central processing unit 550 of the audio processing system 500 is activated and deactivated depending on the power mode, whereas other computing components of the audio processing system 500 remain activated in both power modes. Modifications to the audio processing system 500 can be made to implement the audio processing system 405 of FIG. 4, whereby a splitter 520 is omitted and a sound detector 540 is included in a digital signal processor 560.

In an example, audio data 502 and reference data 504 are received by a down sampler 510 of the audio processing system 500. The audio data 502 corresponds to audio generated by a number of microphones and received over a number of microphone channels. For instance, four or six microphones are included in the device and each generates audio data at ninety-six kHz, where the audio data is sent in audio frames of eight milliseconds in frame length. The reference data 504 is usable for acoustic echo suppression (AES) and acoustic echo cancelation (AEC). In an illustration, the reference data 504 is received over two reference channels when there is an ongoing processing operation (e.g., audio playback, voice communications, and the like). If there is no ongoing processing operation, the reference data 504 may not be received, or can be blanked data (e.g., set to all zero bits).

The down sampler 510 down samples the audio data 502 and the reference data 504 from a first sampling rate (e.g., ninety-six kHz) to a second sampling rate (e.g., sixteen kHz). The down sampled data, illustrated as audio data 512 and reference data 514 is sent to the splitter 520 of the audio processing system 500 (e.g., over four or six audio channels and two reference channels). In turn, the splitter 520 splits the audio data 512 and the reference data 514 and sends audio data 522 and reference data 524 to the digital signal processor 530 of the audio processing system 500 and audio data 526 to the sound detector 540 of the audio processing system 500.

The splitting can involve various operations. In an example, the audio data 512 and the reference data 514 are copied and sent or, merely passed, as the audio data 522 and the reference data 524, respectively (e.g., over four or six audio channels and two reference channels). In addition, a subset of the audio channels can be selected (e.g., one of them) and the corresponding audio (which is a sub-portion of the audio 512) is copied and sent, or merely passed, as the audio data 526 (e.g., over one audio channel). Alternatively, no selection is made and the audio data 512 is copied and sent or, merely passed, as the audio data 526 (e.g., over four or six audio channels). If a selection is made, different approaches are possible. In one approach, the selection is for a default audio channel (e.g., "audio channel 0"). In another approach, the selection can be random. In yet another approach, the selection depends on the signal to noise ratio (SNR) associated with each of the audio data (or, equivalently, with each audio channel), where, for instance, the audio data associated with highest SNR is selected.

The digital signal processor 530 receives the audio data 522 and the reference data 524 and preforms one or more operations thereon. For instance, the digital signal processor 530 performs AES and AEC on the reference data 524. In addition, ASR and/or VOIP operations can be performed on the audio data 522. The digital signal processor 530 stores any resulting audio data (shown as audio data 532 in FIG. 5) that needs further processing by the central processing unit 550 of the audio processing system 500 in a memory buffer 560 of the audio processing system 500.

The sound detector 540 receives the audio data 526 and detects whether audio data 526 is merely ambient noise or includes a sound event. In implementations where the audio data 526 received by the sound detector 540 corresponds to multiple audio channels, the sound detector 540 can select a subset of the audio data 526 (e.g., using the selection factors described above) or use the full set of the audio data 526 for the sound detection (in which case, averaging or some other statistical analysis can be applied to the measurements used by the sound detector on each audio channel for the sound detection). A sound event can be either the start of a sound or a continuity of an already started sound. Based on the detection, the sound detector sends event data 542 to the central processing unit 550, where the sound event 542 indicates the outcome of the detection or the need to transition to a power mode. For instance, the sound event 542 can be sent as a binary bit set to "1" to indicate that no sound event was detected and that the low power mode is applicable. Otherwise, the sound event 542 can be sent as a binary bit set to "0" to indicate that a sound event was detected and that the high power mode is applicable. Other implementations are possible. For instance, the voltage on a line that couples the sound detector 540 with the central processing unit 550 can be set to and maintained at a high voltage to indicate that no sound event was detected and that the low power mode is applicable and, otherwise, to a low voltage. In another example, an application programming interface (API) is used to send, to the central processing unit 550, a flag set to "1" to indicate that no sound event was detected and that the low power mode is applicable and, otherwise, set to '0."

In addition to sending the event data 542 to the central processing unit 550, the sound detector 540 can receive input from the central processing unit 550 indicating whether the sound detection can be disabled or the sound detector 540 can be deactivated. For instance, when the central processing unit 550 is performing playback operations, the central processing unit 550 is operating in the high power mode and the transition to the low power mode may not be permitted until the playback operations are terminated and regardless of whether a sound event is detected or not. This indication can be sent via a binary bit, a voltage line, or an API.

When in the high power mode, the central processing unit 550 receives and processes audio data 562 from the memory buffer 560 (and/or the audio data 512 and the reference data 514 from the down sampler) and/or playback data 572 (e.g., a data stream of a music file from a file source internal or external to the device), and generates and sends output data 552 (e.g., music data to a speaker). In comparison, when in in the low power mode, the central processing unit 550 does not receive, or if received does not process, the audio data 562 and/or the playback data 572 and does not generate and send the output data 552.

Figure 6:
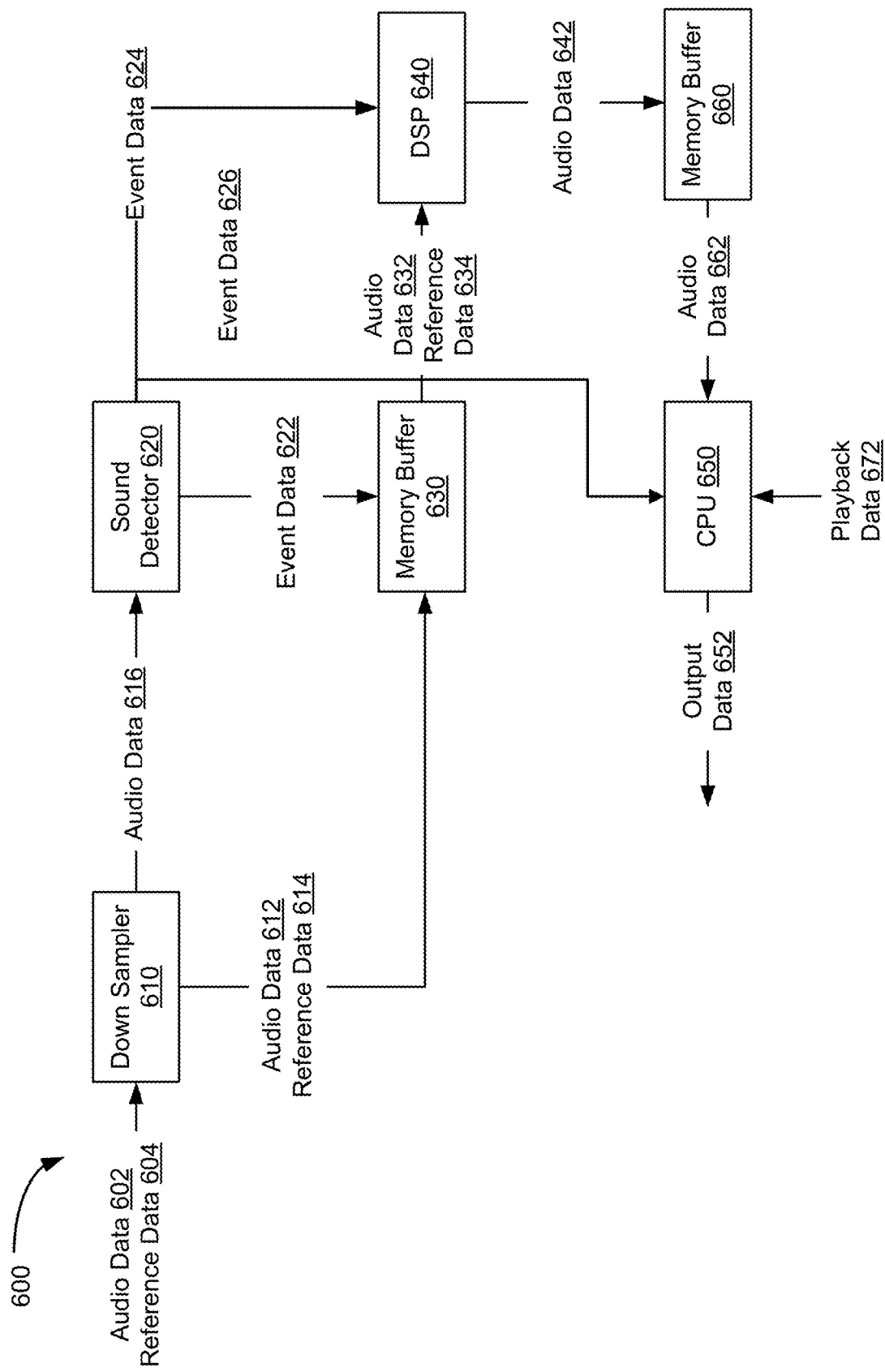
FIG. 6 illustrates another example of an audio processing system of a device that supports sound detection-based control of power modes, according to embodiments of the present disclosure.

FIG. 6 illustrates another example of an audio processing system of a device that supports sound detection-based control of power modes, according to embodiments of the present disclosure. The audio processing system 600 is an example implementation of the audio processing system 305 of FIG. 3. In this implementation, a digital signal processor 640 and a central processing unit 650 of the audio processing system 600 are activated and deactivated depending on the power mode, whereas other computing components of the audio processing system 600 remain activated in both power modes. Modifications to the audio processing system 600 can be made to implement the audio processing system 405 of FIG. 4, whereby a splitter is omitted and a sound detector 620 is included in the digital signal processor 640.

In an example, audio data 602 and reference data 604 are received by a down sampler 610 of the audio processing system 600. The audio data 602 corresponds to audio generated by a number of microphones and received over a number of microphone channels. For instance, four or six microphones are included in the device and each generates audio data at ninety-six kHz where the audio data is sent in audio frames of eight milliseconds in frame length. The reference data 604 is usable for AES and AEC. In an illustration, the reference data 604 is received over two reference channels.

The down sampler 610 down samples the audio data 602 and the reference data 604 from a first sampling rate (e.g., ninety-six kHz) to a second sampling rate (e.g., sixteen kHz). The down sampled data, illustrated as audio data 612 and reference data 614 is sent to a first memory buffer 630 of the audio processing system 600 (e.g., over four or six audio channels and two reference channels). In addition, the down sampler 610 sends a portion of the down sampled data, illustrated as audio data 616, to the sound detector 620 of the audio processing system 600.

The audio data 616 can be selected from the down sampled audio data. Alternatively, no selection is made and all of the down sampled audio data is sent as the audio data 616. If a selection is made, different approaches are possible. In one approach, the selection is for a default audio channel (e.g., "audio channel 0"). In another approach, the selection can be random. In yet another approach, the selection depends on the signal to noise ratio (SNR) associated with each of the audio data (or, equivalently, with each audio channel), where, for instance, the audio data associated with highest SNR is selected.

The sound detector 620 receives the audio data 660 and detects whether audio data 660 is merely ambient noise or includes a sound event. In implementations where the audio data 616 received by the sound detector 620 corresponds to multiple audio channels, the sound detector 620 can select a subset of the audio data 616 (e.g., using the selection factors described above) or use the full set of the audio data 616 for the sound detection (in which case, averaging or some other statistical analysis can be applied to the measurements used by the sound detector on each audio channel for the sound detection). A sound event can be either the start of a sound or a continuity of a sound for which the start has already been detected. Based on the detection, the sound detector sends event data 622 to the first memory buffer 630, where the sound event 622 indicates the outcome of the detection or the need to transition to a power mode. Here, the event data 622 can be used to gate the sending of the buffered audio data 612 and reference data 614 to the digital signal processor 640. When the event data 622 indicates that no sound event was detected and/or that the low power mode is applicable, the buffered audio data 612 and reference data 614 to the digital signal processor 640 is not sent. Otherwise, the buffered audio data 612 and reference data 614 to the digital signal processor 640 is sent. Similarly, the sound detector 620 sends event data 624 to the digital signal processor 640 and event data 626 to the central processing unit 550. Each of the digital signal processor 640 and the central processing unit 650 is activated or deactivated depending on the corresponding event data.

In addition to sending the event data 626 to the central processing unit 650, the sound detector 620 can receive input from the digital signal processor 640 and/or the central processing unit 650 indicating whether the sound detection can be disabled or the sound detector 620 can be deactivated. For instance, when the digital signal processor is performing speech recognition operations or the central processing unit 650 is performing playback operations, both of the digital signal processor 640 and the central processing unit 650 are operating in the high power mode and the transition to the low power mode may not be permitted until the speech recognition operations and the playback operations are terminated and regardless of whether a sound event is detected or not. This indication can be sent via a binary bit, a voltage line, or an API.

When in the high power mode, the digital signal processor 640 receives the buffered audio data 612 and reference data 614, illustrated as audio data 632 and reference data 634, from the first memory buffer 630 and preforms one or more operations thereon. For instance, the digital signal processor 640 performs AES and AEC on the reference data 634. In addition, ASR and/or VOIP operations can be performed on the audio data 632. The digital signal processor 640 stores any resulting audio data (shown as audio data 632 in FIG. 6) that needs further processing by the central processing unit 650 of the audio processing system 600 in a second memory buffer 660 of the audio processing system 600. In comparison, when in in the low power mode, the digital signal processor 660 does not receive, or if received does not process, the audio data 632 and the reference data 634 and does not store the audio data 642 in the second memory buffer 660.

When in the high power mode, the central processing unit 650 receives and processes audio data 662 from the memory buffer 660 (and/or the audio data 612 and the reference data 614 from the down sampler) and/or playback data 672 (e.g., a data stream of a music file from a file source internal or external to the device), and generates and sends output data 652 (e.g., music data to a speaker). In comparison, when in in the low power mode, the central processing unit 650 does not receive, or if received does not process, the audio data 662 and/or the playback data 672 and does not generate and send the output data 652.

Figure 7:
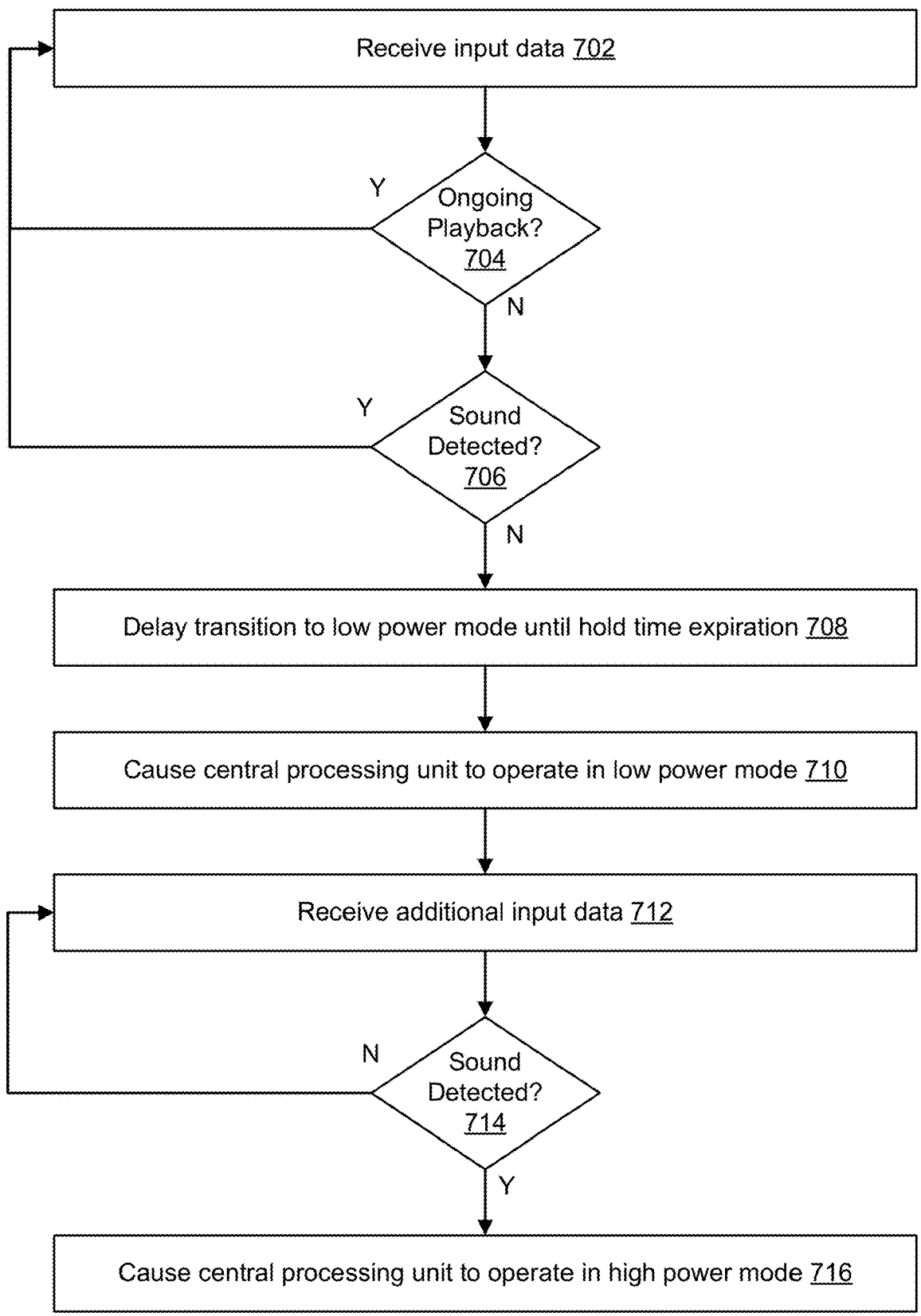
FIG. 7 illustrates an example of a flow for sound detection-based control of power modes, according to embodiments of the present disclosure.

FIG. 7 illustrates an example of a flow for sound detection-based control of power modes, according to embodiments of the present disclosure. Operations of the flow can be performed by a device that includes an audio processing system, such as the device 110 or the device 210, each of which can include any one of the audio processing system 305, the audio processing system 405, the audio processing system 500, or the audio processing system 600. Some or all of the instructions for performing the operations can be implemented as hardware circuitry and/or stored as computer-readable instructions on a non-transitory computer-readable medium of the device. As implemented, the instructions represent modules that include circuitry or code executable by processor(s) of the device. The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 702, where the device receives input data. For instance, a sound detector of the device receives the input data, while the device, or at least a central processing unit of the device, is in a high power mode. The central processing unit sends output data a speaker of the device only while operating in the high power mode. The input data corresponds to audio detected by one or more microphones that generate audio data. Such audio data can be down sampled from a first sampling rate to a second sampling rate. The input data corresponds to the down sampled audio data.

In an example, the flow includes operation 704, where the device determines whether playback operations, or other audio-processing operations, are ongoing. For instance, the central processing unit of the device may be executing an application that provides playback or other audio-processing functionality. If so, the flow loops back to operation 702, whereby the sound detector may be deactivated or disabled from perfuming sound detection operations on the input data. If not, operation 706 follows operation 704.

In an example, the flow includes operation 706, where the device determines whether the input data represents a sound event. For instance, root mean square metrics are derived from measurements on the input data and are used, as further described in connection with the next figures, to determine whether the input data represents a start of a sound or a continuity of the sound (e.g., a duration of the sound exceeding a duration threshold). If either one of the conditions are met, the sound event is detected, and the flow loops back to operation 702, such that the device, or at least the central processing unit, remains in the high power mode. Otherwise, no sound is detected, the input data is presumed to include ambient noise only, and operation 708 follows operation 706 to initiate the transition to the low power mode.

In an example, the flow includes operation 708, where the device delays a transition to the low power mode until an expiration of a hold time. For instance, the device starts a countdown for the length of the hold time. If no sound event is detected during the hold time (e.g., per continuously repeating operation 706 during the hold time), operation 710 follows operation 708 upon the end of the countdown. Otherwise, a sound event is detected and the flow loops pack to operation 702.

In an example, the flow includes operation 710, where the device causes the central processing unit to operate in a low power mode. For instance, the sound detector sends event data to the central processing unit indicating that no sound event was detected and/or that the low power mode is applicable. If other computing components of the device are to be also deactivated (e.g., a speaker, a digital signal processor, etc.), the event data can be similarly sent to these computing components.

In an example, the flow includes operation 712, where the device receives additional input data. For instance, the sound detector of the device remains in the high power mode and continuously or at time intervals receives the additional input data, while at least the central processing unit of the device is in the low power mode. The input data corresponds to additional audio detected by the one or more microphones that generate additional audio data. Such additional audio data can also be down sampled from the first sampling rate to the second sampling rate. The additional input data corresponds to the additional down sampled audio data.

In an example, the flow includes operation 714, where the device determines whether a sound event is detected. For instance, the sound detector continuously or at time intervals processes the additional input data to determine sound events. If no sound event is detected, at least the central processing unit can remain in the low power mode and, accordingly, the flow loops back to operation 712. Otherwise, operation 716 follows operation 714.

In an example, the flow includes operation 716, where the device causes the central processing unit to operate in the high power mode. For instance, the sound detector sends event data to the central processing unit indicating that a sound event was detected and/or that the high power mode is applicable. In the high power mode, the central processing unit performs an action on the input data (e.g., further processes the input data to detect a request for a playback operation). If other computing components of the device are to be also activated (e.g., a speaker, a digital signal processor, etc.), the event data can be similarly sent to these computing components.

Figure 8:
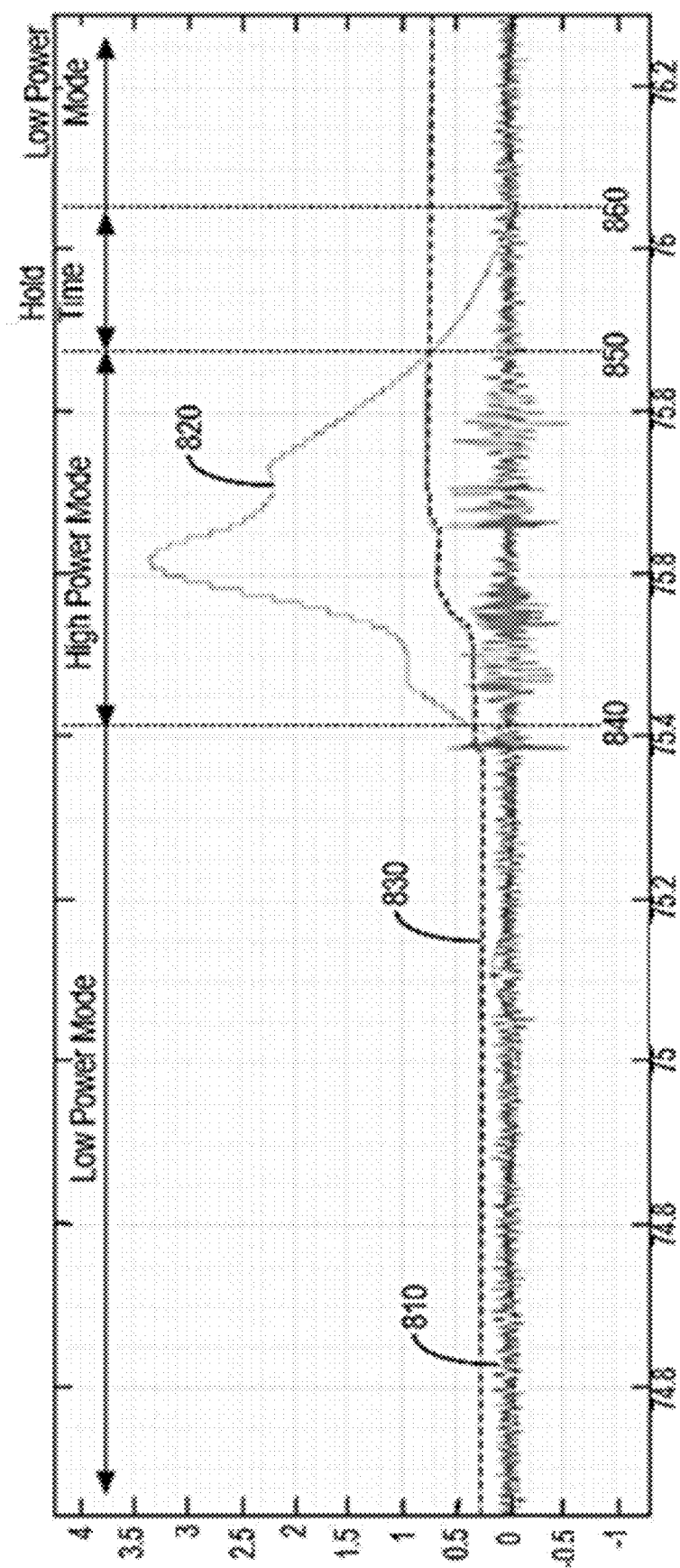
FIG. 8 illustrates an example of root mean square (RMS) metrics usable to detect a start of a sound, according to embodiments of the present disclosure.

FIG. 8 illustrates an example of root mean square metrics usable to detect a start of a sound, according to embodiments of the present disclosure. As explained herein above, a device can detect a sound event, where the sound event is a start of a sound. Upon detection of the start, the device can transition from a low power mode to a high power mode. The detection can rely on a set of root square metrics. In an example, the set indicates a difference over time between an overall ambient acoustic energy around the device and changing acoustic activity at the device. The set also indicates an instantaneous change to the overall ambient acoustic energy. FIG. 8 shows a plot of audio 810, the difference 820 between the overall ambient acoustic energy around the changing acoustic activity derived based on root mean square measurements on the audio 810, and the instantaneous change 830 to the overall ambient acoustic energy derived based on the root mean square measurements. Once the difference 820 exceeds the instantaneous change 830, a start 840 of a sound is detected. Once the difference 820 no longer exceeds the instantaneous change 830, an end 850 of the sound is detected.

As shown in FIG. 8, the device (or at least a central processing unit of the device) can be in the low power mode before the detection of the start 840. Between the start 840 and the end 850, the device is in the high power mode. After the end 850 is detected, a hold time is used to retain the device in the high power mode until an extended time 860. Thereafter, the device (or at least the central processing unit) can transition back to the low power mode.

Figure 9:
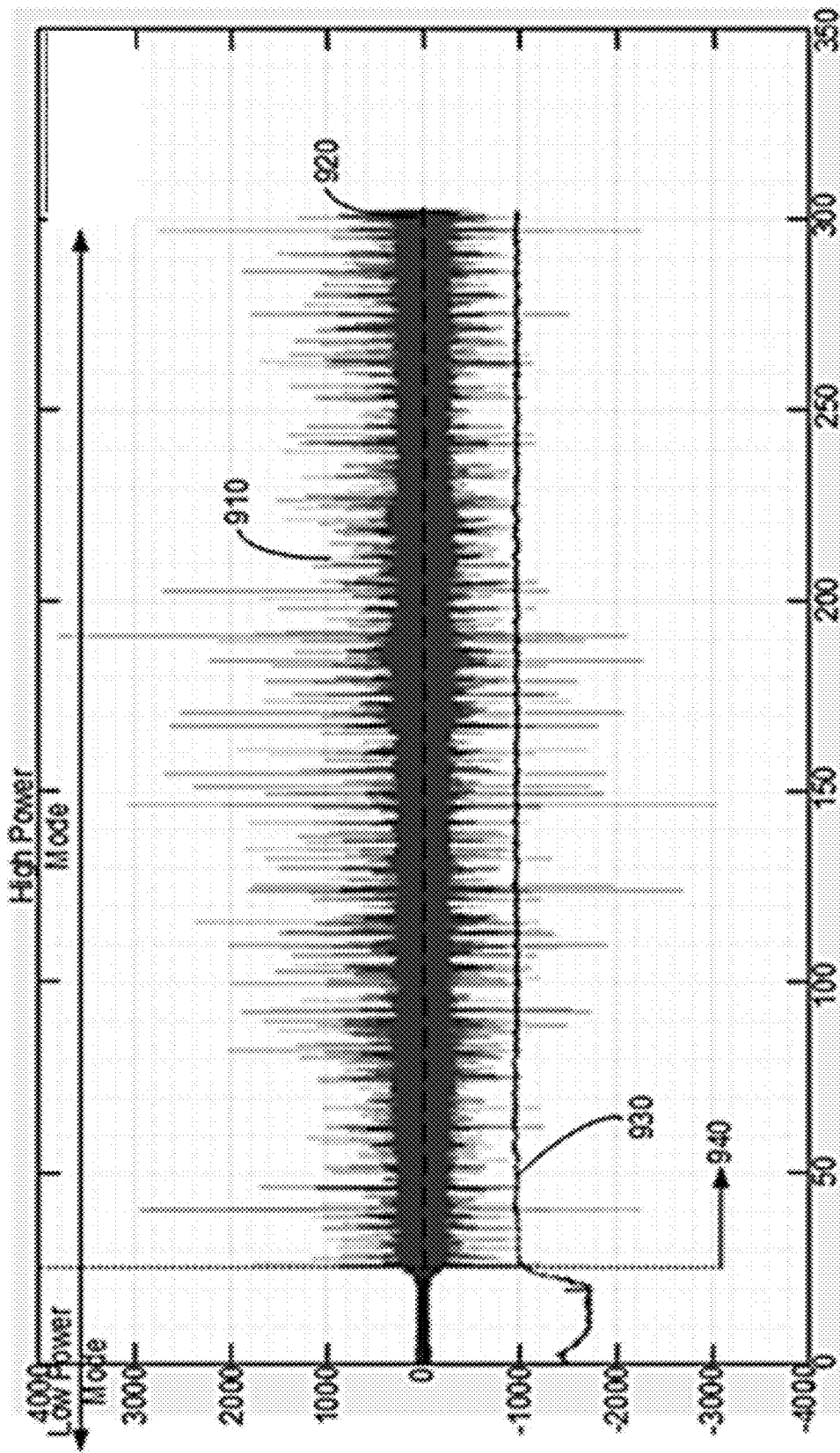
FIG. 9 illustrates an example of root mean square metrics usable to detect a continuity of a sound, according to embodiments of the present disclosure.

FIG. 9 illustrates an example of root mean square metrics usable to detect a continuity of a sound, according to embodiments of the present disclosure. As explained herein above, a device can detect a sound event, where the sound event is a continuity of a sound. As long as the sound continues to be detected, the device remains in a low power mode. The detection can rely on a set of root square metrics. In an example, the set indicates an instantaneous change to an overall ambient acoustic energy around the device. The set also indicates an instantaneous change to acoustic activity at the device. FIG. 9 shows a plot of audio 910, the instantaneous change 920 to the overall ambient acoustic energy derived based on root mean square measurements on the audio 910, and the instantaneous change 930 to the acoustic activity derived based on the root mean square measurements. As long as the instantaneous change 930 to the acoustic activity exceeds a threshold, a continuity 940 of the sound is detected, even when the instantaneous change 920 to the overall ambient acoustic does not change much.

As shown in FIG. 9, the device (or at least a central processing unit of the device) can be in the low power mode before the detection of the continuity 940. Thereafter, the device is in the high power mode.

Figure 10:
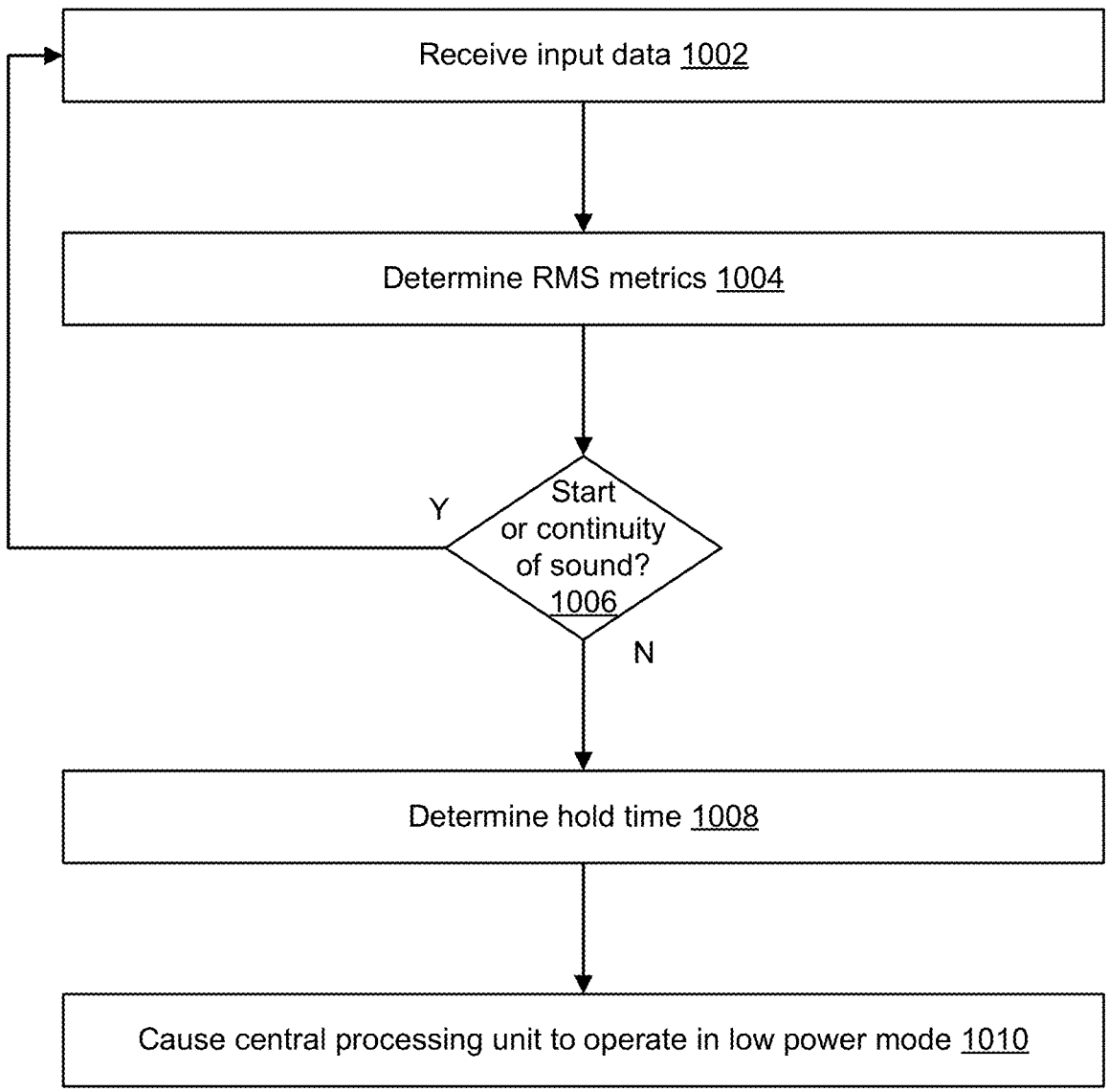
FIG. 10 illustrates an example of a flow for determining a sound event and sending data about the determination, according to embodiments of the present disclosure.

FIG. 10 illustrates an example of a flow for determining a sound event and sending data about the determination, according to embodiments of the present disclosure. Operations of the flow can be performed by a sound detector of a device, such as any one of the sound detector 350, the sound detector 450, the sound detector 540, or the sound detector 620. Some or all of the instructions for performing the operations can be implemented as hardware circuitry and/or stored as computer-readable instructions on a non-transitory computer-readable medium of the sound detector. As implemented, the instructions represent modules that include circuitry or code executable by processor(s) of the sound detector. The use of such instructions configures the sound detector to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 1002, where the sound detector receives input data. For instance, the sound detector receives the input data, while the device, or at least a central processing unit of the device, is in a high power mode. The input data corresponds to audio detected by one or more microphones that generate audio data. Such audio data can be down sampled from a first sampling rate to a second sampling rate. The input data corresponds to the down sampled audio data.

In an example, the flow includes operation 1004, where the sound detector determines root mean square metrics based on the input data. Various sets of root mean square metrics can be determined. As described herein above in connection with FIGS. 8 and 9, a first set can indicate an overall ambient acoustic energy around the device over time. A second set can indicate an instantaneous change to the overall ambient acoustic energy. A third set can indicate an acoustic activity at the device over time. And a fourth set can indicate the instantaneous change to the acoustic activity.

In an illustration, the root mean square metrics include:

$$x_1[n] \triangleq 10 \cdot \log_{10}\left(\sum_m \text{input}^2[m]\right) \quad (1)$$

$$x_2[n] = (1 - \alpha_{FAST}) \cdot x_1[n] + \alpha_{FAST} \cdot x_2[n-1] \quad (2)$$

$$x_3[n] = (1 - \alpha_{FAST}) \cdot x_1[n] + \alpha_{FAST} \cdot x_3[n-1] \quad (3)$$

$$x_4[n] = (1 - \alpha_{SLOW}) \cdot |x_1[n]|^2 + \alpha_{SLOW} \cdot x_4[n-1] \quad (4)$$

$$x_5[n] = x_4[n] - |x_3[n]|^2 \quad (5)$$

$$x_6[n] = (1 - \alpha_{FAST}) |x_1[n]|^2 \quad (6)$$

$$x_7[n] = x_6[n] - |x_2[n]|^2 \quad (7)$$

$$x_8[n] = x_2[n] - x_2[n] \quad (8)$$

$$x_9[n] = \sum_{m=1}^{10} x_8[n] \quad (9)$$

Equation (1) defines the root mean square metric. Equations (2) and (3) correspond to a fast tracking filter and a slow tracking filter, with an "a" smoothing factor set to 0.9 and 0.995, respectively (or some other values). The fast tracking filter indicates the history of the acoustic activity at the device. The slow tracking filter indicates the history of the overall ambient acoustic energy. Equations (4) and (5) are the statistical moment and variance computation of the root mean square metric, respectively. These equations enable measuring the changes in root mean square with respect to the long term root mean square values. In particular, Equation (5) indicates the instantaneous change to the overall ambient acoustic energy. Equations (6) and (7) are the statistical moment of root means square and instantaneous variance computation of fast smoothing root mean square metric, respectively. These equations enable measuring the changes in root mean square with respect to the short term root mean square values. In particular, Equation (7) indicates the instantaneous change to the acoustic activity at the device. Equation (8) is a subtraction in order to remove bias and emphasis on trend of the root mean square metric (upwards or downwards). Equation (9) is the moving average of unbiased root mean square metric. This equation gives a smoother version of the trend of the root mean square.

In an example, the flow includes operation 1006, where the sound detector detects whether a start of the sound or a continuity of the sound is detected. The detection can involve the four sets of root mean square metrics described herein above. For instance, and referring back to the above illustrative examples, a sound event is detected according to the following equation:

$$x_{10}[n] = \begin{cases} 1, x_8[n] > \textit{DIFFTHR} \text{ AND } x_9[n] > x_5[n]) \text{ OR } (x_5[n] > \textit{SLOWVARTHR}) \text{ OR } x_7[n] > \textit{FASTVARTHR}) \\ 0, \text{ else} \end{cases} \quad (10)$$

Per Equation (10), if a positive trend "$x_8$" exceeds a first predefined threshold (shown as "DIFFTHR") and if the slow smooth root mean square variance "$x_5$" is less than the smoothed unbiased root mean square "$x_9$," the start of the sound is detected. If the slow smooth root mean square variance "$x_5$" exhibits a high value that exceeds a second predefined threshold (e.g., a first variance threshold, shown as "SLOWVARTHR"), the continuity of the sound is detected. Likewise, if instantaneous root mean square variance "$x_7$" exhibits value above a third predefined threshold (e.g., a second variance threshold, shown as "FAST-VARTHR"), the continuity of the sound is detected. If any of these three sets of conditions is met, the sound event is detected an output of "1" is generated to indicate the detection of sound activity. In this case, operation 1008 follows operation 1006. If none of the three sets of conditions is met, an output of "0" is generate to indicate that the environment is quiet (e.g., only ambient noise is detected). In this case, the flow loops back to operation 1002. In an illustration, the value for "DIFFTHR" is one, "SLOW-VARTHR" is five, and "FASTVARTHR" is −1200.

In an example, the flow includes operation 1008, where the sound detector determines a hold time for delaying the transition from the high power mode to the low power mode. In an illustration, the hold time is pre-configured (e.g., based on a user setting). In another illustration, the hold time can be computed based on a frame length of audio frames. For instance, the hold time is computed using the following equations:

$$x_{11}[n] = \begin{cases} x_{10}[n], & x_7[n] > 0 \\ a_{hold} \cdot x_{11}[n-1], & \text{else} \end{cases} \quad (11)$$

$$x_{12}[n] = \begin{cases} 1, & x_{11}[n] > \text{HOLD\_THRESH} \\ 0, & \text{else} \end{cases} \quad (12)$$

$$\text{where: } a_{hold} = 10 \frac{\log_{10}(\text{HOLD}_{THRESH})}{\tau \cdot F_f} \quad (13)$$

$$F_f = \frac{1 \text{ second}}{8 \text{ milliseconds}} = 125 \text{ frames/sec} \quad (14)$$

Equations (11), (12), and (13) are used to apply additional hold time on the output generated by Equation (1) in order to keep at least the central processing unit activated. If the output of Equation (10) is "1." Otherwise, the hold time is computed as an exponential decay. The exponentially decayed function is now subjected to a predefined threshold (shown as "HOLD_THRESH") in order to increase the hold time "τ." Equation (14) defines the frame rate.

In an example, the flow includes operation 1010, where the sound detector causes the central processing unit to operate in the low power mode. For instance, per Equation (10), an output of "0" is sent once the hold time expires, where this output indicates that no sound event was detected.

Although the above flow is described in connection with the transition from the high power mode to the low power mode, the flow can be similarly applied for the opposite transition. In particular, the sound detector remains activated in the low power mode and can continuously or at time intervals receive input data, determine root mean square metrics, and detect a sound event while at least the central processing unit is deactivated in the low power mode. If a sound event is detected, the sound detector can send event data to at least the central processing unit to transition to the high power mode. Here, no hold time may be used. But if no sound event is determined, the sound detector need not activate at least the central processing unit.

Figure 11:
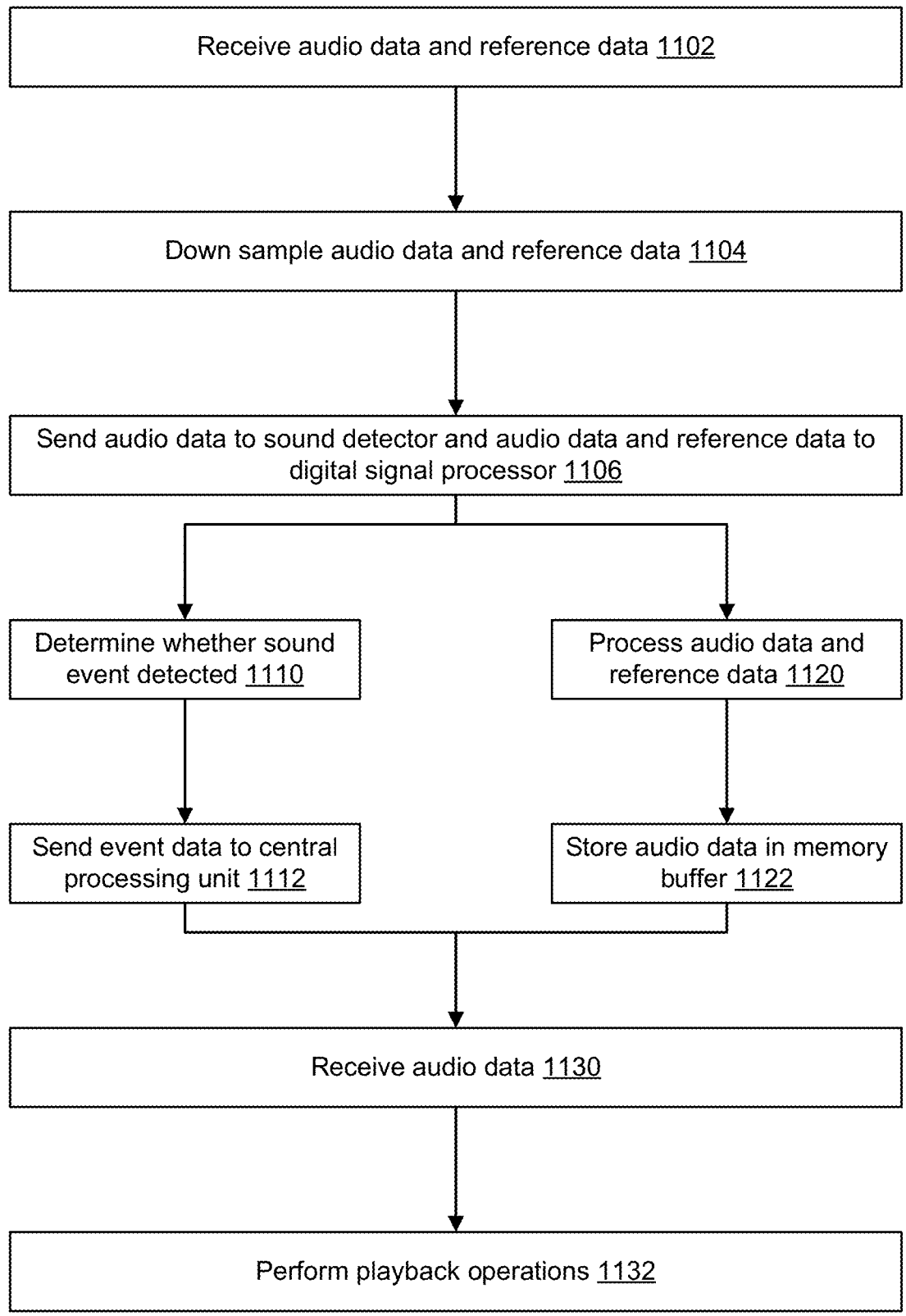
FIG. 11 illustrates an example of a flow for processing audio detected at a microphone and controlling a power mode of a device, according to embodiments of the present disclosure.

FIG. 11 illustrates an example of a flow for processing audio detected at a microphone and controlling a power mode of a device, according to embodiments of the present disclosure. Operations of the flow can be performed by an audio processing system of a device, such as any one of the audio processing system 305, the audio processing system 405, or the audio processing system 500. Some or all of the instructions for performing the operations can be implemented as hardware circuitry and/or stored as computer-readable instructions on a non-transitory computer-readable medium of the audio processing system. As implemented, the instructions represent modules that include circuitry or code executable by processor(s) of the audio processing system. The use of such instructions configures the audio processing system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 1102, where the audio processing system receives audio data and reference data. For instance, a down sampler of the audio processing system receives the audio data over one or more audio channels (e.g., four or six audio channels) and the reference data over one or more reference channels (e.g., two reference channels). The audio data and the reference data has a first sampling rate (e.g., ninety-size kHz).

In an example, the flow includes operation 1104, where the audio processing system down samples the audio data and the reference data from the first sampling rate to a second sampling rate (e.g., sixteen kHz). For instance, the down sampler performs this operation and outputs down sampled audio data over one or more audio channels (e.g., four or six audio channels) and down sampled reference data over one or more reference channels (e.g., two reference channels).

In an example, the flow includes operation 1106, where the audio processing system sends audio data to a sound detector of the audio processing system and audio data and reference data to a digital signal processor of the audio processing system. For instance, a splitter of the audio processing system receives the down sampled audio data over the one or more audio channels and the down sampled reference data over the one or more reference channels. The splitter can select a portion or send all of the down sampled audio data to the sound detector over the applicable number of audio channels. Further, the splitter sends, to the digital signal processor, the down sampled audio data over one or more audio channels (e.g., four or six audio channels) and the down sampled reference data over one or more reference channels (e.g., two reference channels).

In an example, the flow includes operation 1110, where the audio processing system determines whether a sound event is detected. For instance, the sound detector receives audio data from the splitter. If the audio data corresponds to all of the down sampled audio data, the sound detector can select a portion from it for further processing (e.g., by determining a first SNR of first input data and a second SNR of second input data, comparing the two SNRs, and using the input data that has the larger SNR). Otherwise, the sound detector processes the received audio data. In both examples, the processing includes generating root mean square metrics (e.g., per Equations (1)-(10)) and detecting, based on these metrics, whether a start of a sound or a continuity of the sound is detected (e.g., per Equation (10)).

In an example, the flow includes operation 1112, where the audio processing system sends event data to a central processing system of the audio processing system. For instance, the sound detector sends the event data, where the event data indicates whether the sound event is detected or not. A hold time can be computed per Equations (11)-(14) before sending the data if the central processing unit is to transition from a high power mode to the low power mode. In addition, operations 1110-1112 can be disabled (e.g., not performed) if the central processing unit is performing audio-processing operations where the audio data is received at operation 1102.

In an example, the flow includes operation 1120, where the audio processing system processes audio data and reference data. For instance, the digital signal processor receives the down sampled audio data and the down sampled reference data from the splitter, performs AES and AEC, and performs ASR, VOIP, or other audio processing operations to output audio data.

In an example, the flow includes operation 1122, where the audio processing system stores the audio data that is output by the digital signal processor in a memory buffer of the audio processing system. For instance, the digital signal processor sends this audio data to the memory buffer.

In an example, the flow includes operation 1130, where the audio processing system receives audio data stored in the memory buffer. For instance, the central processing unit accesses the buffered audio data. In the case where the central processing unit was in the low power mode when audio data was buffered and has transitioned to the high power mode, the central processing unit may catch up to real-time audio data (e.g., audio data currently received). During the catching up period of time, the central processing unit processes the buffered audio data at a rate faster than the one used for processing the real-time audio data. In particular, the audio data includes audio frames, each having a particular length of time (e.g., eight milliseconds) and including a number of audio samples (e.g., one-hundred twenty-eight audio samples when a sixteen kHz sampling rate is used). The central processing unit processes more than the length of time of audio samples in each time interval equal to the length of time (e.g., more than eight milliseconds of audio or, equivalently, more than one-hundred twenty-eight audio samples are processed by the central processing unit in eight milliseconds intervals).

In an example, the flow includes operation 1132, where the audio processing system performs playback operations or other audio-processing operations based on the received and processed audio data. For instance, the central processing unit determines a request from the processed audio data to start a particular audio stream and, accordingly, streams the applicable audio data from an audio source.

Figure 12:
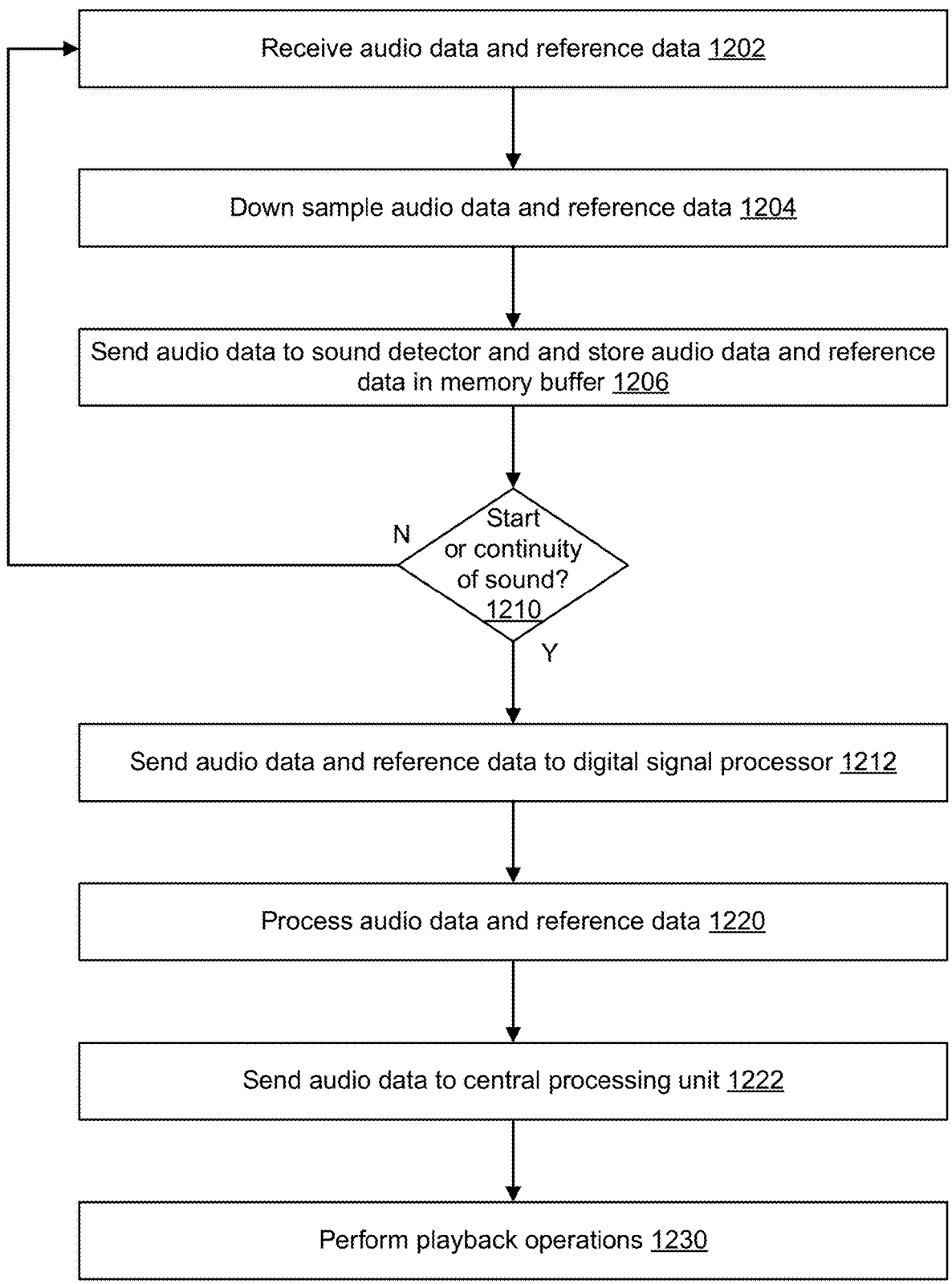
FIG. 12 illustrates another example of a flow for processing audio detected at a microphone and controlling a power mode of a device, according to embodiments of the present disclosure.

FIG. 12 illustrates another example of a flow for processing audio detected at a microphone and controlling a power mode of a device, according to embodiments of the present disclosure. Operations of the flow can be performed by an audio processing system of a device, such as any one of the audio processing system 305, the audio processing system 405, or the audio processing system 600. Some or all of the instructions for performing the operations can be implemented as hardware circuitry and/or stored as computer-readable instructions on a non-transitory computer-readable medium of the audio processing system. As implemented, the instructions represent modules that include circuitry or code executable by processor(s) of the audio processing system. The use of such instructions configures the audio processing system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 1202, where the audio processing system receives audio data and reference data. For instance, a down sampler of the audio processing system receives the audio data over one or more audio channels (e.g., four or six audio channels) and the reference data over one or more reference channels (e.g., two reference channels). The audio data and the reference data has a first sampling rate (e.g., ninety-size kHz). The reference data can be received when there is an ongoing processing operation (e.g., audio playback, voice communications, and the like). If there is no ongoing processing operation, the reference data may not be received, or can be blanked data (e.g., set to all zero bits).

In an example, the flow includes operation 1204, where the audio processing system down samples the audio data and the reference data from the first sampling rate to a second sampling rate (e.g., sixteen kHz). For instance, the down sampler performs this operation and outputs down sampled audio data over one or more audio channels (e.g., four or six audio channels) and down sampled reference data over one or more reference channels (e.g., two reference channels).

In an example, the flow includes operation 1206, where the audio processing system sends audio data to a sound detector of the audio processing system and stores audio data and reference data in a first memory buffer of the audio processing system. For instance, the down sampler can select a portion or send all of the down sampled audio data to the sound detector over the applicable number of audio channels. Further, the down sampler sends, to the first memory buffer, the down sampled audio data over one or more audio channels (e.g., four or six audio channels) and the down sampled reference data over one or more reference channels (e.g., two reference channels).

In an example, the flow includes operation 1210, where the audio processing system determines whether a sound event is detected. For instance, the sound detector receives audio data from the down sampler. If the audio data corresponds to all of the down sampled audio data, the sound detector can select a portion from it for further processing. Otherwise, the sound detector processes the received audio data. In both examples, the processing includes generating root mean square metrics (e.g., per Equations (1)-(10)) and detecting, based on these metrics, whether a start of a sound or a continuity of the sound is detected (e.g., per Equation (10)). If no sound event is detected, the flow loops back to operation 1202, where a central processing unit and a digital signal processor of the audio processing system can remain in a low power mode and the received audio data and reference data can continue to be down sampled and buffered. Otherwise, operation 1212 follows operation 1210, where the central processing unit and the digital signal processor can transition to the high power mode.

In an example, the flow includes operation 1212, where the audio processing system sends audio data and reference data to the digital signal processor. For instance, the digital signal processor receives the buffered audio data and reference data from the memory buffer.

In an example, the flow includes operation 1220, where the audio processing system processes the audio data and the reference data. For instance, the digital signal processor performs AES and AEC, and performs ASR, VOIP, or other audio processing operations to output audio data. In the case where the digital signal processor was in the low power mode when the audio data and the reference data were buffered and has transitioned to the high power mode, the digital signal processor may catch up to real-time audio data (e.g., audio data currently received). During the catching up period of time, the digital signal processor processes the buffered audio data at a rate faster than the one used for processing the real-time audio data. In particular, the audio data includes audio frames, each having a particular length of time (e.g., eight milliseconds) and including a number of audio samples (e.g., one-hundred twenty-eight audio samples when a sixteen kHz sampling rate is used). The digital signal processor processes more than the length of time of audio samples in each time interval equal to the length of time (e.g., more than eight milliseconds of audio or, equivalently, more than one-hundred twenty-eight audio samples are processed by the digital signal processor in eight milliseconds intervals).

In an example, the flow includes operation 1222, where the audio processing system sends the output audio data to the central processing system. For instance, the digital signal processes stores the output audio data in a second memory buffer of the audio processing system. In turn, the central processing unit receives the buffered audio data from the second memory buffer.

In an example, the flow includes operation 1230, where the audio processing system performs playback operations or other audio-processing operations based on the received and audio data. For instance, the central processing unit determines a request to start a particular audio stream and, accordingly, streams the applicable audio data from an audio source.

Figure 13:
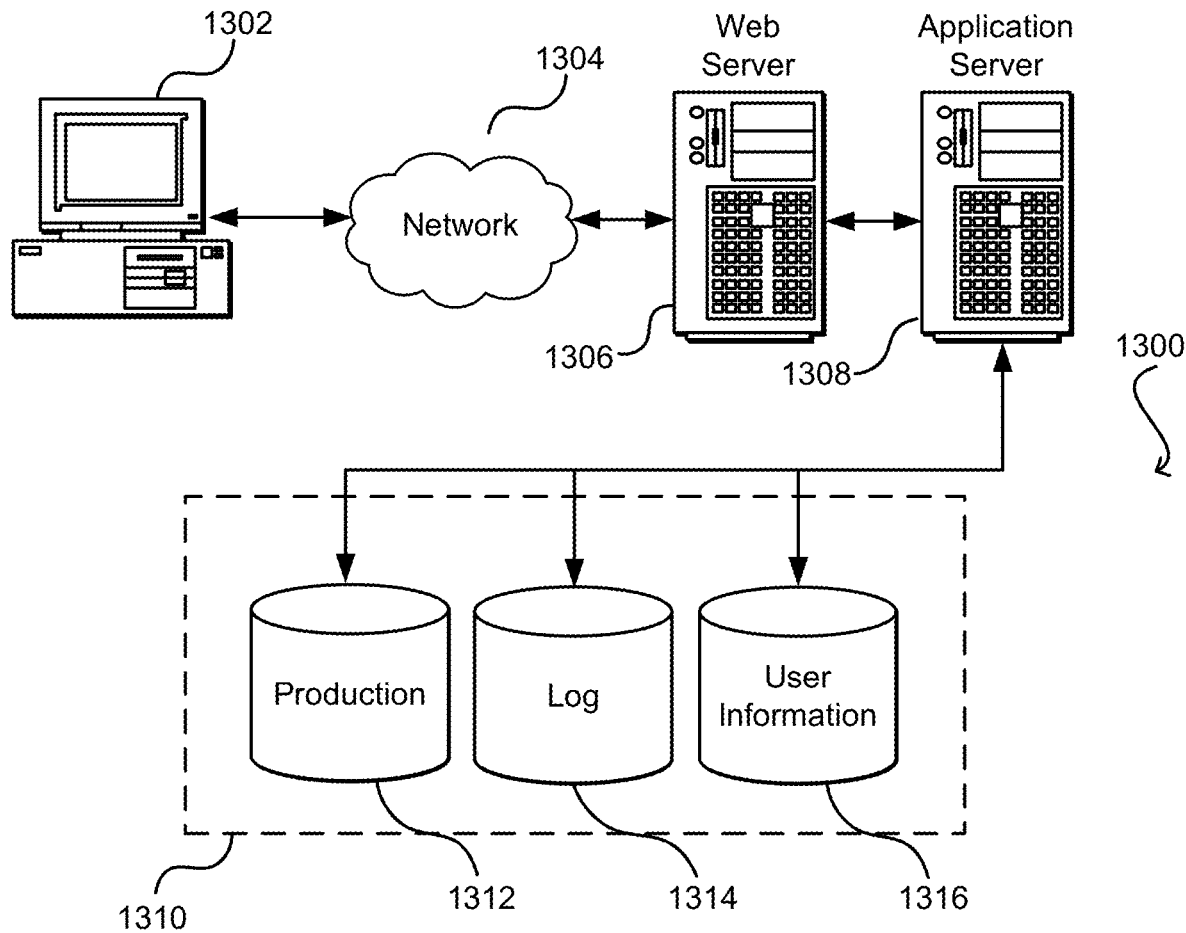
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302 (such as any of the multimedia devices described herein above), which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more web applications that may be implemented as one or more scripts or programs written in any programming language, such as Java©, C, C #, or C++, or any scripting language, such as Perl, Python, or TCL, as well as combinations thereof. The server(s) may also include database servers, including without limitation those commercially available from Oracle©, Microsoft®, Sybase®, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"), familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a," "an," "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A device comprising:
    a speaker;
    a central processing unit configured to:
        operate in a first power mode or a second power mode, wherein, in the second power mode, the central processing unit consumes less power than the first power mode, and
        send output data to the speaker only while operating in the first power mode;
    a microphone; and
    a sound detector comprising a processor and a memory storing instructions that, upon execution by the processor, configure the sound detector to:
        receive first input data corresponding to first audio detected by the microphone in the first power mode;
        determine first root mean square (RMS) metrics from the first input data;
        determine that the first RMS metrics indicate that the first input data represents ambient noise;
        send first event data to the central processing unit, the first event data causing the central processing unit to operate in the second power mode;
        receive second input data corresponding to second audio detected by the microphone in the second power mode;
        determine second RMS metrics from the second input data;
        determine that the second RMS metrics indicate that the second input data represents sound being detected by the microphone;
        send second event data to the central processing unit, the second event data causing the central processing unit to operate in the first power mode;
        receive status data of the central processing unit indicating that the central processing unit is performing a playback operation; and
        cease, based at least in part on the status data, analysis of whether third input data received after the second input data represents a second sound event.

2. The device of claim 1, further comprising:
    a memory buffer accessible to the central processing unit;
    a down sampler configured to:
        receive audio data generated by the microphone at a first sampling rate, wherein the audio data corresponds to the second audio; and
        generate the second input data by down sampling the audio data using a second sampling rate; and
    a digital signal processor configured to:
        receive the second input data in the second power mode;
        detect a wake word based on the second input data; and
        store, in the memory buffer, the second input data,
    wherein the central processing unit is further configured to:
        receive, from the memory buffer, the second input data in the first power mode; and
        perform an action based on the second input data.

3. The device of claim 2, wherein the second input data corresponds to audio frames, wherein each one of the audio frames has a time length, and wherein the central processing unit is configured to receive the second input data at a rate faster than the time length.

4. A method implemented by a device, the method comprising:
    receiving, while the device is operating in a first power mode, first input data corresponding to first audio detected by a microphone;
    determining whether the first input data represents a first sound event that is other than ambient noise;
    operating, based at least in part on a determination that the first input data represents the ambient noise only, in a second power mode in which the device consumes less power than in the first power mode;

receiving, while the device is operating in the second power mode, second input data corresponding to second audio detected by the microphone;

causing, based at least in part on the second input data, the device to operate in the first power mode; and ceasing, based at least in part on a determination that the device is executing an audio function, analysis of third input data received after the second input data.

5. The method of claim 4, further comprising:
determining that the second input data represents a second sound event, wherein the device is caused to operate in the first power mode based at least in part on the second input data representing the second sound event.

6. The method of claim 5, wherein determining that the second input data represents the second sound event comprises determining at least one of: a start of a sound or a duration of the sound exceeding a duration threshold, wherein the start of the sound is determined based at least in part on a history of a root mean square (RMS) metric measured on the second input data and fourth input data that is previously received, and wherein the duration of the sound is determined based at least in part on an instantaneous variance of the RMS metric.

7. The method of claim 6, wherein the start of the sound is determined by at least determining an average of the RMS metric from the history and comparing the average to a variance of the RMS metric, and wherein the duration of the sound is determined by at least comparing the instantaneous variance of the RMS metric to a variance threshold.

8. The method of claim 4, wherein determining that the first input data represents the ambient noise only comprises determining root mean square (RMS) metrics from the first input data and determining that the RMS metrics do not indicate a start of a sound and a duration of the sound exceeding a duration threshold.

9. The method of claim 4, wherein receiving first input data comprises receiving an audio frame, and wherein the method further comprises:
prior to causing the device to operate in the second power mode, determining a hold time based at least in part on a duration of the audio frame, the hold time being a time period during which the device remains operating in the first power mode, and
causing the device to operate in the second power mode upon expiration of the hold time.

10. The method of claim 4, further comprising:
storing, by a digital signal processor (DSP) of the device while the device is operating in the second power mode, the second input data in a memory buffer accessible to a central processing unit (CPU) of the device; and
receiving, by the CPU while the CPU is operating in the first power mode, the second input data from the memory buffer.

11. The method of claim 4, further comprising:
receiving fourth input data correspond to third audio detected by another microphone of the device;
determining a first signal to noise ratio (SNR) of the second input data and a second SNR of the fourth input data;
determining that the first SNR is larger than the second SNR; and
determining, based at least in part on the first SNR, that the second input data represents the second sound event.

12. The method of claim 4, further comprising:
while the device is operating in the second power mode:
receiving fourth input data correspond to third audio detected by another microphone; and
determining the second sound event based at least in part on the second input data and the fourth input data.

13. A system comprising:
a central processing unit configured to operate in a first power mode or a second power mode in which the central processing unit consumes less power than the first power mode; and
a sound detector comprising a processor and a memory storing instructions that, upon execution by the processor, configure the sound detector to:
receive, while the central processing unit is operating in the first power mode, first input data corresponding to first audio detected by a microphone;
determine that the first input data represents ambient noise only;
cause the central processing unit to operate in the second power mode based at least in part on the first input data representing ambient noise only;
receive, while the central processing unit is operating in the second power mode, second input data corresponding to second audio detected by the microphone;
determine that the second input data represents a sound event;
cause the central processing unit to operate in the first power mode; and
cease, based at least in part on a determination that the central processing unit is executing an audio function, analysis of third input data received after the second input data.

14. The system of claim 13, wherein the memory stores further instructions that, upon execution by the processor, configure the sound detector to additionally:
receive status data of the central processing unit indicating that the central processing unit is performing a playback operation corresponding to the audio function, wherein ceasing the analysis of the third input data is based at least in part on the status data.

15. The system of claim 13, wherein the microphone is configured to generate audio data and echo cancellation data using a first sampling rate, and wherein the system further comprises a down sampler, wherein the down sampler is configured to:
receive the audio data and the echo cancellation data;
generate the second input data by at least down sampling the audio data to a second sampling rate; and
generate down sampled echo cancellation data by at least down sampling the echo cancellation data to the second sampling rate, wherein the sound detector is configured to receive the second input data and not the down sampled echo cancellation data.

16. The system of claim 15, further comprising:
a digital signal processor configured to receive, while the central processing unit is operating in the second power mode, the second input data and the down sampled echo cancellation data.

17. The system of claim 16, wherein the digital signal processor is further configured to store, in a memory buffer, at least the second input data, and wherein the central processing unit is further configured to receive the second input data from the memory while operating in the first power mode.

18. The system of claim 13, wherein the second input data corresponds to audio frames, wherein each one of the audio frames has a first time length, and wherein the central processing unit is further configured to receive, from a memory buffer, the second input data at a rate corresponding to a second time length shorter than the first time length.

19. The system of claim 13, further comprising:
a digital signal processor configured to operate in the first power mode or the second power mode, and receive, while the digital signal processor is operating in the first power mode, the second input data.

20. The system of claim 19, wherein the memory stores further instructions that, upon execution by the processor, configure the sound detector to additionally:
store, while the digital signal processor is operating in the second power mode, the second input data in a memory buffer, and wherein the digital signal processor is further configured to receive, from the memory buffer, the second input data while the digital signal processor is operating in the first power mode.

* * * * *